「(12) United States Patent
Kubota et al.

(10) Patent No.: US 7,057,809 B2
(45) Date of Patent: Jun. 6, 2006

(54) PROJECTION SCREEN

(75) Inventors: Shigeo Kubota, Kanagawa (JP);
Junichi Ohsako, Tokyo (JP);
Masayasu Kakinuma, Kanagawa (JP);
Kazuhito Shimoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 10/474,768

(22) PCT Filed: Mar. 14, 2003

(86) PCT No.: PCT/JP03/03090

§ 371 (c)(1),
(2), (4) Date: Oct. 14, 2003

(87) PCT Pub. No.: WO03/077027

PCT Pub. Date: Sep. 18, 2003

(65) Prior Publication Data

US 2005/0018285 A1    Jan. 27, 2005

(30) Foreign Application Priority Data

Mar. 14, 2002  (JP) .............................. 2002-070572
Mar. 5, 2003   (JP) .............................. 2003-058008

(51) Int. Cl.
  G03B 21/56    (2006.01)
  G03B 21/60    (2006.01)
  G03B 21/14    (2006.01)
  G02B 6/10     (2006.01)
(52) U.S. Cl. ...................... 359/443; 359/454; 359/459; 353/84; 385/131
(58) Field of Classification Search ................ 359/443, 359/454, 459; 353/84; 349/110; 385/131
See application file for complete search history.

(56) References Cited

U.S. PATENT DOCUMENTS

| | | | | |
|---|---|---|---|---|
| 4,752,116 | A | * | 6/1988 | Sekiguchi .................... 359/457 |
| 5,193,015 | A | * | 3/1993 | Shanks ........................ 349/115 |
| 5,715,083 | A | * | 2/1998 | Takayama .................... 359/443 |

FOREIGN PATENT DOCUMENTS

| | | |
|---|---|---|
| DE | 197 47 597 | 8/1998 |
| JP | 60-140201 A | 7/1985 |
| JP | 06-289491 A | 10/1994 |
| JP | 63-147108 A | 1/1995 |
| JP | 07-261274 | 10/1995 |
| JP | 07-270915 | 10/1995 |
| JP | 11-015079 A | 1/1999 |
| WO | WO 96/21883 | 7/1996 |
| WO | WO 00/45220 | 8/2000 |

\* cited by examiner

Primary Examiner—W. B. Perkey
Assistant Examiner—Magda Cruz
(74) Attorney, Agent, or Firm—Robert J. Depke; Trexler Bushnell et al.

(57) ABSTRACT

A clear image unaffected by the brightness of the projection environment. The projection screen according to the present invention is a projection screen for projecting thereupon narrow-band tricolor wavelength band light to display an image, and comprises an optical thin film (3) which has high reflection properties regarding the narrow-band tricolor wavelength band light, and has high transmission properties regarding at least visible wavelength band light other than the wavelength band light, on a screen base (2). With the projection screen according to the present invention configured as above, the optical thin film (3) serves as a so-called band filter. That is to say, the optical thin film (3) particularly reflects narrow-band tricolor wavelength band light and transmits light of other wavelengths, thereby functioning as a narrow-band tricolor wavelength bandwidth filter acting to separate these.

24 Claims, 17 Drawing Sheets

WAVELENGTH (nm)

WAVELENGTH (nm)

WAVELENGTH (nm)

WAVELENGTH (nm)

WAVELENGTH (nm)

WAVELENGTH (nm)

WAVELENGTH (nm)

WAVELENGTH (nm)

WAVELENGTH (nm)

WAVELENGTH (nm)

PROJECTION SCREEN

This application claims priority to Japanese Patent Application Number JP2002-070572, FILED Mar. 14, 2002, and Japanese Patent Application Number JP2003-058008, filed Mar. 5, 2003, which are incorporated herein by reference.

1. Technical Field

The present invention relates to a projection screen, and particularly to a projection screen wherein projected images from projector light can be recognized well even under bright light.

2. Background Art

In recent years, overhead projectors and slide projectors have come into widespread use as ways for speakers in conferences and the like to display material. Also, video projectors and moving picture film projectors using liquid crystal are coming into widespread use in common homes, as well. The projection method of these projectors involve modulating light output from a light source with a transmission-type liquid crystal panel or the like to form image light, and emitting the image light through an optical system such as lenses and the like so as to be projected on a screen.

For example, a front projector capable of forming color images on a screen comprises an illumination optical system for splitting the light emitted from the light source into rays of the colors red (R), green (G), and blue (B), and converging these on predetermined optical paths, liquid crystal panels (light valves) for light modulation of the light fluxes of each of the colors R, G, and B that have been split by the illumination light system, and a light synthesizing unit for synthesizing the light fluxes of each of the colors R, G, and B that have been modulated by the liquid crystal panels, thereby projecting an enlarged color image synthesized by the light synthesizing unit through projecting lenses.

Also, as of recent, a type of projector device has been developed which uses narrow-band tricolor light source as the light source, and uses grating light valves (GLV) instead of liquid crystal panels to perform spatial modulation of the light fluxes of each of the colors R, G, and B.

Now, with projectors such as described above, a projection screen is used for obtaining the projected image, and projection screens can be generally classified into transmission types wherein the projection light is cast from behind the screen and viewed from the front of the screen, and reflection types wherein the projection light is cast from the front of the screen and the reflected light off of the screen from the projected light is viewed. With either type, a bright image and an image with high contrast is necessary to realize a screen with good visibility. However, the above-described front projectors cannot reduce influence of external light using an ND filter or the like as with light-emitting displays or rear projectors, and accordingly there is the problem that raising the contrast of bright portions on the screen is difficult.

That is to say, with projection methods of projectors described above, projected light that has been subjected to image processing is reflected off of the screen, so the contrast of the image is greatly affected by the surrounding brightness, so simply increasing the reflectivity of the screen increases the reflectivity of the external light as well as the projected light thereby reducing the recognition of the image. Thus, it is difficult to obtain a clear image in the event that the projection environment is bright.

The present invention has been made in light of the conventional circumstances, and accordingly it is an object of the present invention to provide a clear image which is not affected by the brightness of the projection environment.

DISCLOSURE OF INVENTION

The projection screen according to the present invention for achieving the above-described object is a projection screen for projecting thereupon narrow-band tricolor wavelength band light to display an image, comprising an optical thin film, which has high reflection properties regarding the narrow-band tricolor wavelength band light, and has high transmission properties regarding at least visible wavelength band light other than the wavelength band light, on a supporting member.

With the projection screen according to the present invention configured thus, the optical thin film serves as a band filter, as if it were. That is to say, the optical thin film particularly reflects narrow-band tricolor wavelength band light and transmits light of other wavelengths, thereby functioning as a narrow-band tricolor wavelength bandwidth filter acting to separate these.

The greater part of the narrow-band tricolor wavelength band light is reflected with this projection screen due to the optical thin film. Conversely, in the event that external light is cast thereupon, the greater part thereof is transmitted through the projection screen, and is hardly reflected at all.

Accordingly, with the projection screen according to the present invention, the narrow-band tricolor wavelength band light can be selectively reflected, and reflection of external light can be suppressed as compared to normal screens. Consequently, deterioration in contrast of the image formed on the projection screen is suppressed while effectively reducing influence of external light, thereby obtaining a bright image. Accordingly, with this projection screen, a clear image can be obtained even in the event that the projection environment is bright, and a clear image can be obtained unaffected by the brightness of the projection environment.

In order to obtain the above-described functions, the design of the optical thin film is important. For example, the above-described advantages can be obtained by designing the optical thin film so as to be formed of a dielectric multi-layer film wherein high-refractive-index layers and low-refractive-index layers are alternately layered, and wherein, with the refractive index of each layer in the dielectric multi-layer film as n and the film thickness of each layer as d, the optical thickness nd of each layer of the dielectric multi-layer film satisfies the following Expression (3) with regard to each wavelength $\lambda$ of each output light of the narrow-band tricolor light source.

$$nd = \lambda(a \pm \tfrac{1}{4}) \text{ (a is a natural number)} \tag{3}$$

Now, in the event that the optical thin film has been designed so as to satisfy the conditions of the above Expression (3) for all of the tricolor wavelength, the optical thin film has formed a reflection band with regard to the narrow-band tricolor wavelength band light. As a result, this exhibits high reflection properties with regard to the narrow-band tricolor wavelength band light. On the other hand, high transmissivity is exhibited regarding visible wavelength band light other than these wavelengths.

For example, in the event of combining blue laser light having a wavelength of 457 nm, green laser light having a wavelength of 532 nm, and red laser light having a wavelength of 642 nm, as the narrow-band tricolor wavelength band light, a design satisfying the conditions of the above Expression (3) for all of the tricolor wavelengths can be made, thereby realizing an optical thin film functioning as the above-described bandwidth filter.

With the projection screen according to the present invention, in addition to the optical thin film functioning as a bandwidth filter, providing a light diffusing layer as the outermost layer of the optical thin layer or as an intermediate layer of the optical thin layer is also effective. A light diffusing layer scatters light reflected at the optical thin film so as to obtain scattered light. In the event that there is no light diffusing layer, the observer only observes the reflection specular components as the reflected light from the projection screen. Having the reflection specular components alone is disadvantageous for the observer since the field of view is restricted and so forth. On the other hand, providing a light diffusing layer allows the observer to observe the diffused light, so the field-of-view properties are greatly improved, and a natural image can be visually recognized.

Also, another projection screen according to the present invention is a projection screen for projecting thereupon light of a predetermined wavelength band to display an image, comprising an optical thin film which has high reflection properties regarding the light of a predetermined wavelength band, and has high transmission properties regarding at least visible wavelength band light other than the wavelength band light.

While narrow-band tricolor wavelength band light can be used as the light source for projecting an image of the projection screen as described above, light-emitting devices such as light-emitting diodes for example, which have relatively wide light-emitting wavelength, can also be used for the light source. Also, an arrangement may be made by combining a light source with a somewhat wide bandwidth with filters, non-linear optical devices, or non-linear optical thin films, to divide the wavelength thereof within the visible range like the three primary colors. As for the light having the predetermined wavelength band, tricolor wavelength band light obtained by combining emission light having a peak but also a relatively wide band as with light-emitting diodes may be used, and further single color, or two colors or four colors or more may be combined and used. With this structure as well, the optical thin film has the tendency to effectively reflect light having a predetermined wavelength band and mainly the primary wavelength band thereof, and to generally transmit light having wavelengths other than the primary wavelength band thereof. The principal wavelength of the predetermined wavelength band light is reflected well with this projection screen due to the optical thin film. Conversely, in the event that external light is cast thereupon for example, the greater part thereof is transmitted through the projection screen, and is hardly reflected at all.

BEST MODE FOR CARRYING OUT THE INVENTION

The present invention will be described now, with reference to the drawings. Note that the present invention is not limited to the following description, and various modifications can be made as suitable within the spirit and scope of the present invention.

The projection screen according to the present invention is a projection screen on which narrow-band tricolor wavelength band light is projected to display an image, and has an optical thin film, with high reflective properties regarding the narrow-band tricolor wavelength band light and with high transmissivity properties as to visible wavelength band light other than the aforementioned wavelength band light, on a supporting member.

Figure 1:
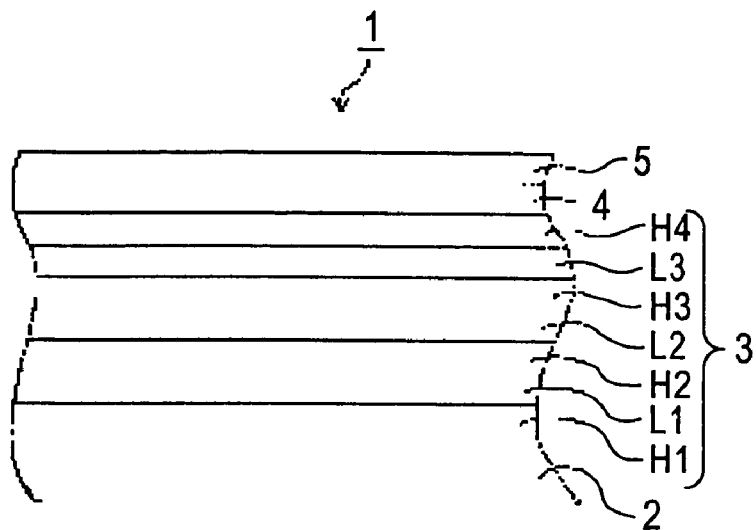
FIG. 1 is a cross-sectional diagram illustrating a configuration example of a projection screen according to the present invention.

FIG. 1 shows a cross-sectional diagram of a front projector screen which is a projection screen configured applying the present invention. The projector screen 1 is a projector screen for displaying images from a diffraction grating projector using grating light valves (hereafter referred to as "GLV"), and images are displayed by projecting narrow-band tricolor wavelength band light which is the output light from a narrow-band tricolor light source which is the light source of the diffraction grating projector. The projector screen 1 comprises an optical thin film 3 which is a dielectric multi-layer film functioning as a band filter, on a screen base 2, with a light diffusing layer 4 provided on the optical thin film 3, and a protective film 5 further provided thereupon.

Now, a narrow-band tricolor light source does not refer to a light source which has a wavelength bandwidth in the order of tens of nm as with light-emitting diodes (LED), but to a light source which has a wavelength bandwidth of several nm, and primarily refers to a laser light source. The output light from the narrow-band tricolor light source has very little width in the wavelength, so a clear image can be formed by using a narrow-band tricolor light source as compared with other types of light sources.

The screen base 2 is a supporting member for the projector screen 1, and can be configured of, for example, a polymer such as polyethylene terephthalate (PET), polyethylene naphthalate (PEN), polyethersulfone (PES) polyolefin (PO), or the like. Also, the screen base 2 is formed with a black color by including black paint or the like. Making the color of the screen base 2 black in this way allows the screen base itself to function as a light absorbing layer, thereby preventing reflection of light transmitted through the optical thin film 3 by the screen base 2 absorbing the light transmitted through the optical thin film 3, as described later. Thus, the narrow-band tricolor wavelength band light can be obtained as reflected light in a more sure manner as described later, and the black level can be improved, improving contrast. Also, instead of using the screen base 2, a configuration may be used wherein black paint is applied to the front side of the screen base 2, in which case the black paint serves as the light absorbing layer which absorbs without reflecting the light transmitted through the optical thin film 3, improving the black level, thereby improving contrast.

The optical thin film 3 is formed by alternately layering high-refractive-index layers H which are dielectric thin films formed of high-refractive-index material and low-refractive-index layers L which are dielectric thin films formed of low-refractive-index material, and with the refractive index of each layer in the dielectric multi-layer film, i.e., the high-refractive-index layers H and the low-refractive-index layers L, as n and the film thickness of each layer as d, the optical thickness nd of each dielectric thin film satisfies the following Expression (4) with regard to each wavelength λ of the narrow-band tricolor wavelength band light which is the output light from the narrow-band tricolor light source.

$$nd = \lambda(a \pm 1/4) \text{ (a is a natural number)} \quad (4)$$

That is to say, the optical thin film 3 is configured of alternating layers of high-refractive-index layers H and low-refractive-index layers L, with the optical thickness nd of each layer matching a predetermined value. Here, the optical thickness nd is preferably within the range of 1.462 µm to 1.467 µm. The optical thin film 3 forms a reflective band having high reflection properties regarding the narrow-band tricolor wavelength light which is the output light from the narrow-band tricolor light source at the wavelength position satisfying such conditions. Due to this reflective band being formed, the narrow-band tricolor wavelength light which is the output light from the narrow-band tricolor light source is reflected from the optical thin film 3 without being transmitted. Also, the optical thin film 3 has high transmissivity properties regarding light of a wavelength band other than the reflective band. That is to say, the optical thin film 3 selectively serves as a narrow-band tricolor wavelength band filter which reflects the narrow-band tricolor wavelength light and generally transmits light of wavelength bands other than this.

Accordingly, due to having such an optical thin film 3, the projector screen 1 selectively reflects the narrow-band tricolor wavelength band light which is the output light from the narrow-band tricolor light source, but generally transmits light of wavelength bands other than this. The light which is transmitted through the optical thin film 3 is absorbed by the screen base 2 functioning as a light absorbing layer without being reflected as described above, so the narrow-band tricolor wavelength light reflected at the reflective band can be extracted as reflected light.

Thus, with the projector screen 1, even in the event that external light is cast into the projector screen 1, light other than the narrow-band tricolor wavelength light is cut by being transmitted, so problems such as deterioration of contrast due to external light and influence of external light and the like can be prevented.

That is to say, with this projector screen 1, the narrow-band tricolor wavelength light can be selectively reflected, and reflection of external light can be suppressed as compared with normal screens, so deterioration of the contrast of images formed on the projector screen 1 can be suppressed while effectively reducing influence of external light, thereby obtaining a bright image. Accordingly, with the projector screen 1, a clear image can be obtained even in cases wherein the projection environment is bright, and a clear image can be obtained without being affected by the brightness of the projection environment.

Also, from the above description, the steeper the wavelength properties of the output light from the narrow-band tricolor light source of the projector are, the closer the reflected light from the screen can be made to be the output light from the projector due to the synergistic effects with the optical thin film 3, thereby increasing advantages of the present invention. A light source which has a wavelength width of around several nm such as laser light for example, is suitable for the narrow-band tricolor light source.

Also, a reflective band having high reflection properties regarding the narrow-band tricolor wavelength band light is formed in the event of the optical thickness nd of each layer in the dielectric multi-layer film satisfying the conditions of the aforementioned Expression (4) as described above, but there is not always a combination of three natural numbers a wherein the optical thickness nd satisfies the conditions of the aforementioned Expression (4), with regard to arbitrary tricolor wavelengths. An example of a combination which satisfies the conditions is a combination of blue laser light having a wavelength of 457 nm, green laser light having a wavelength of 532 nm, and red laser light having a wavelength of 642 nm, for example. These wavelengths are light source wavelengths used with a diffraction grading projector apparatus 11 using GLVs. With this combination, in the event that the optical thickness nd is set to approximately 1.467 μm, the optical thickness nd is approximately 3.25 times the wavelength of the blue laser light, approximately 2.75 times the wavelength of the green laser light, and approximately 2.25 times the wavelength of the red laser light, which approaches the conditions of the aforementioned Expression (4). In this way, with the present invention, the conditions of the aforementioned Expression (4) do not need to be rigorously met, and the above-described advantages can be obtained by approximating the conditions.

Note that in FIG. 1, H1, H2, H3, and H4 each denote high-refractive-index layers, and L1, L2, and L3 each denote low-refractive-index layers.

With this projector screen 1, the optical thin film 3 is formed by alternating high-refractive-index layers H and low-refractive-index layers L in order to realize a selective reflection spectrum, but the number of layers is not particularly restricted, and a desired number of layers can be used. The width of the reflective band and so forth can be adjusted by changing the number of layers. Also, the dielectric multi-layer film is preferably formed with an odd number of layers with the narrow-band tricolor wavelength band light incident side and the outermost layer on the opposite side being high-refractive-index layers. Configuring the dielectric multi-layer film, i.e., the optical thin film 3, of an odd number of dielectric thin films, makes the functions as a narrow-band tricolor wavelength band filter more excellent that a case wherein the dielectric multi-layer film is formed of an even number of dielectric thin films.

As for a specific number of layers, the total of the high-refractive-index layers H and the low-refractive-index layers L is preferably 7 to 11 layers. In the event that the number of layers is too small, the functions of the narrow-band tricolor wavelength band filter may not be sufficiently exhibited, and in the event that the number of layers is too great, fabrication of the optical thin film 3 takes time. Accordingly, configuring the optical thin film 3 of 7 to 11 layers as the total of the high-refractive-index layers H and the low-refractive-index layers L allows an optical thin film 3 which sufficiently functions as a narrow-band tricolor wavelength band filter to be effectively configured.

With the optical thin film 3, the reflectivity at a specific wavelength band is increased by increasing the number of layers, and with two arrangements with the same number of layers, the configuration which has the greater difference in refractive index between the high-refractive-index layers H and the low-refractive-index layers L has the higher reflectivity. Accordingly, the refractive index of the high-refractive-index layers H making up the optical thin film 3 should be as high as possible, specifically between 2.1 and 2.7. In the event that the refractive index of the high-refractive-index layers H is smaller than 2.1, a massive amount of layers becomes necessary to realize the desired selective reflection spectrum, and on the other hand, there are few optical thin-film materials which have a refractive index greater than 2.7, restricting the range of selection of materials for the high-refractive-index layers H. The high-refractive-index layers H having such a refractive index can be configured of high-refractive-index materials such as zinc sulfide (ZnS), titanium oxide ($TiO_2$), cerium oxide ($CeO_2$), zirconium oxide ($ZrO_2$), and so forth.

Also, the refractive index of the low-refractive-index layers L making up the optical thin film 3 should be as low as possible, specifically between 1.3 and 1.5. The same logic applies here to the low-refractive-index materials as with the high-refractive-index materials, in that in the event that the refractive index of the low-refractive-index layers L is greater than 1.5, a massive amount of layers becomes necessary to realize the desired selective reflection spectrum, and on the other hand, there are few optical thin-film materials which have a refractive index smaller than 1.3, restricting the range of selection of materials for the low-refractive-index layers L. The low-refractive-index layers L having such a refractive index can be configured of a low-refractive-index material such as magnesium fluoride ($MgF_2$).

Also, the projector screen 1 comprises a light diffusing layer 4 upon the optical thin film 3, as shown in FIG. 1. The projector screen 1 reflects the narrow-band tricolor wavelength band light owing to having the optical thin film 3, so an observer observes the reflected image of the image projected on the projector screen 1, i.e., views the reflected light of the image projected on the projector screen 1. However, in the event that the reflected light from the screen is the reflection specular components alone, this is disadvantageous for the observer since the field of view is restricted and so forth.

The projector screen 1 comprises a light diffusing layer 4, which allows diffused reflected light from the projector screen 1 to be observed. The light diffusing layer 4 is configured so as to selectively scatter light of a predetermined wavelength band, i.e., narrow-band tricolor wavelength light. That is to say, the light diffusing layer 4 has light scattering properties with regard to the narrow-band tricolor wavelength band light. With an arrangement wherein the light diffusing layer 4 is provided upon the optical thin film 3 as shown in FIG. 1, the light which has passed through the light diffusing layer 4 and is reflected off of the optical thin film 3 passes through the light diffusing layer 4 again. At this time, the light reflected off of the optical thin film 3 is diffused at the time of passing through the light diffusing layer 4, so scattered reflected light other than the reflection specular components can be obtained. Both the specular components and the scattered reflected light exist in the light reflected from the projector screen 1, so the observer can observe the scattered reflected light besides the reflection specular components, and accordingly, the field of view properties are greatly improved. As a result, the observer can visually recognize a natural image.

Also, the scattered reflected light is the light which has been reflected off of the optical thin film 3 being scattered. The light of a predetermined wavelength band, i.e., the narrow-band tricolor wavelength light is reflected off of the optical thin film 3, so the scattered reflected light is also approximately narrow-band tricolor wavelength light. Accordingly, even in the event that external light is cast into the projector screen 1, light other than the narrow-band tricolor wavelength light does not become scattered reflected light, so there is no deterioration in contrast or effects of external light due to the light diffusing layer 4, and a suitable field of view can be obtained.

For example, considering a screen configuration wherein a light diffusing layer with a scattering coefficient of S is the topmost layer, and an optical thin film of a multi-layer thin film structure having a reflectivity of R is disposed beneath, with the intensity of incident light to the screen being 1, the intensity of scattered light Is from the screen can be expressed by the following Expression (5).

$$Is = 1 \cdot S + (1-S)RS \quad (5)$$

On the other hand, the reflected specular component Ir is as shown in the following Expression (6).

$$Ir = (1-S)R(1-S) \quad (6)$$

For the sake of ease of understanding, let us assume ideal cases of R=1 and R=0. These ideal cases are expressed as follows.

First, in the case of R=1, the following Expressions (7) through (9) hold.

$$Is = 1 \cdot S + (1-S)S = S(2-S) \quad (7)$$

$$Ir = (1-S)^2 \quad (8)$$

$$Is/Ir = S(S-2)/(1-S)^2 \quad (9)$$

Also, in the case of R=0, the following Expressions (10) and (11) hold.

$$Is = 1 \cdot S \quad (10)$$

$$Ir = 0 \quad (11)$$

Figure 2:
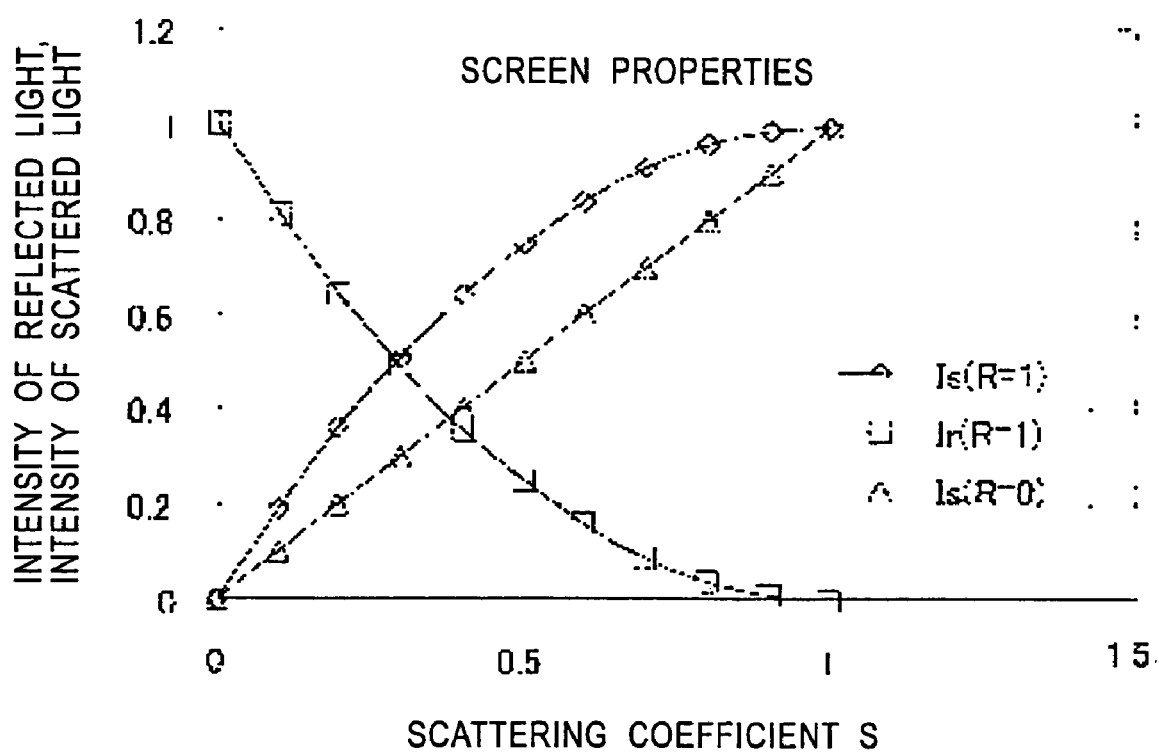
FIG. 2 is a properties diagram illustrating the relation between scattering coefficients, and the intensity of reflected light and the intensity of scattered light.

These can be illustrated as shown in FIG. 2. As can be understood from FIG. 2, in the event that the value of the scattering coefficients increase from 0 to 1, the value of the intensity of scattered light Is (R=1) with reflectivity of R=1 is generally twice the value of the intensity of scattered light Is (R=0) with reflectivity of R=0 in a case that the value of S is small, but the difference between the value of the intensity of scattered light Is (R=1) with reflectivity of R=1 and the value of the intensity of scattered light Is (R=0) with reflectivity of R=0 disappears as the value of S approaches 1.

For example, in the event that a light diffusing layer can be realized wherein the scattering coefficient S has spectral properties, and the scattering coefficient is great in the wavelength band wherein the reflectivity R=1 but small in the wavelength band wherein the reflectivity R=0, the ratio of intensity of scattered light can be made greater than the above-described 2 in the event that the spectral scattering properties are smooth.

A light diffusing layer having such spectral scattering properties can be configured by using metal fine particles, for example. One way is to form a light diffusing layer by dispersing metal fine particles in a certain medium. A light diffusing layer configured by dispersing metal fine particles in this way exhibits excellent light scattering properties with regard to light of a specific wavelength, according to various conditions such as the type and size of the metal fine particles to be used, the refractive index of the medium used to disperse the metal fine particles, and so forth. That is to say, a projector screen having excellent light scattering properties regarding light of a specific wavelength can be realized by having such a light diffusing layer.

An example of metal fine particles capable of configuring such a light diffusing layer is silver fine particles. For example, a light diffusing layer configured by dispersing spherical silver fine particles around 25 nm in radius in a medium having a refractive index of around 1.49 has excellent light scattering properties regarding light in the blue wavelength band. That is to say, having a light diffusing layer configured using silver fine particles realizes a projector screen having excellent light scattering properties regarding light in the blue wavelength band.

With a projector screen 1 configured by providing a light diffusing layer 4 configured using such silver fine particles upon the optical thin film 3 for example, of the light which passes through the light diffusing layer 4, the narrow-band tricolor wavelength light is reflected off of the optical thin film 3, and is returned to the light diffusing layer 4 again. Of the narrow-band tricolor wavelength band light returned to the light diffusing layer 4, the light of the blue wavelength band is further scattered upon passing through the light diffusing layer 4, so that scattered reflected light is formed. That is to say, both the reflected specular components and the scattered reflected light exist for the light of the blue wavelength band, so the field-of-view properties are markedly improved, and a projector screen with excellent visibility can be realized.

Also, an arrangement may be made wherein, instead of markedly improving the field-of-view properties as described above, the field-of-view properties of a particular wavelength are assisted by using such a light diffusing layer. For example, a light diffusing layer configured by dispersing one spherical silver fine particle around 40 nm in radius in a medium having a refractive index of around 1.6 has excellent light scattering properties regarding light in the green wavelength band. However, dispersing a plurality of such spherical silver fine particles in the same medium yields light scattering properties having a gradual peak at the green wavelength band.

Thus, providing a light diffusing layer wherein multiple such spherical silver fine particles are dispersed in the same medium allows the field-of-view properties of a particular wavelength to be assisted instead of markedly improving the field-of-view properties at the green wavelength band. Such a light diffusing layer is suitable for fine adjustment, such as striking a balance with other wavelength bands.

Also, with a light diffusing layer configured by dispersing metal fine particles in a medium, the weight of the metal fine particles per unit area affects the light scattering properties of the light diffusing layer more than the distribution density of the metal fine particles or the thickness of the light diffusing layer, so the amount of the metal fine particles should be set taking this point into consideration.

Another example of metal fine particles capable of configuring such a light diffusing layer is copper fine particles. Copper fine particles have excellent light scattering properties regarding light in the red wavelength band, so using copper fine particles allows a light diffusing layer having excellent light scattering properties regarding light in the red wavelength band to be configured. That is to say, having a light diffusing layer configured using copper fine particles realizes a projector screen having excellent light scattering properties regarding light in the red wavelength band.

With a projector screen 1 configured by providing a light diffusing layer 4 configured using such copper fine particles upon the optical thin film 3 for example, of the light which passes through the light diffusing layer 4, the narrow-band tricolor wavelength light is reflected off of the optical thin film 3, and is returned to the light diffusing layer 4 again. Of the narrow-band tricolor wavelength band light returned to the light diffusing layer 4, the light of the red wavelength band is further scattered upon passing through the light diffusing layer 4, so that scattered reflected light is formed. That is to say, both the reflected specular components and the scattered reflected light exist for the light of the red wavelength band, so the field-of-view properties are markedly improved, and a projector screen with excellent visibility can be realized.

Also, gold fine particles can be used for the aforementioned metal fine particles. A light diffusing layer using gold fine particles has excellent light scattering properties regarding light in the green wavelength band. That is to say, having a light diffusing layer configured using copper fine particles realizes a projector screen having excellent light scattering properties regarding light in the green wavelength band.

With a projector screen 1 configured by providing a light diffusing layer 4 configured using such copper fine particles upon the optical thin film 3 for example, of the light which passes through the light diffusing layer 4, the narrow-band tricolor wavelength light is reflected off of the optical thin film 3, and is returned to the light diffusing layer 4 again. Of the narrow-band tricolor wavelength light returned to the light diffusing layer 4, the light of the green wavelength band is further scattered upon passing through the light diffusing layer 4, so that scattered reflected light is formed. That is to say, both the reflected specular components and the scattered reflected light exist for the light of the green wavelength band, so the field-of-view properties are markedly improved, and a projector screen with excellent visibility can be realized.

Also, nickel fine particles can be used for the aforementioned metal fine particles. A light diffusing layer configured by dispersing one spherical nickel fine particle in a medium having a refractive index of around 1.6 has excellent light scattering properties regarding light in the green wavelength band, primarily. However, dispersing a plurality of such spherical silver fine particles in the same medium yields broad light scattering properties.

Thus, providing a light diffusing layer wherein multiple such spherical nickel fine particles are dispersed in the same medium allows the field-of-view properties of the blue wavelength band, green wavelength band, and the red wavelength band to be assisted instead of markedly improving the field-of-view properties of a particular wavelength band for one of the blue wavelength band, green wavelength band, and the red wavelength band. This allows for fine adjustment such as the contrast and brightness of the overall image. Thus, a projector screen with excellent contrast and brightness for the overall image can be realized by providing a light diffusing layer configured using nickel fine particles.

One layer may be provided of the above-described light diffusing layer 4, or multiple light diffusing layers 4 may be provided, depending on the purpose of use of the projector screen. The light diffusing layer 4 may be provided on the uppermost layer of the optical thin film 3, i.e., the dielectric multi-layer film, or may be provided as an intermediate layer of the dielectric multi-layer film. In this case as well, the same advantages as described above can be had.

Also, this light diffusing layer 4 does not have to be configured as a separate layer as the optical thin film 3 dispersed in the medium as described above, and an arrangement may be made wherein, for example, predetermined metal fine particles are dispersed in the low-refractive-index layers so that the low-refractive-index layers also function as light diffusing layers. Such a configuration can simplify the configuration of the projector screen, thus reducing the thickness of the projector screen.

The protective film 5 does not function optically, i.e., as a band filter, and is for externally protecting the light diffusing layer 4 and the optical thin film 3. For example, in the event that the high-refractive-index layers are formed with zinc sulfide (ZnS), the configuration is vulnerable to moisture, so in the event that the projector screen is used in humid environments or exposed to water, the optical thin film 3 may deteriorate, which may lead to lower durability and quality. Also, scuffing or scratching due to external factors may lead to lower durability and quality. Accordingly, forming the protective layer 5 protects the light diffusing layer 4 and the optical thin film 3, so a projector screen with good durability and quality can be realized.

Also, as for the diffraction grating projector, a diffraction grating projector apparatus 11 configured using GLVs such as described below can be used.

Figure 3:
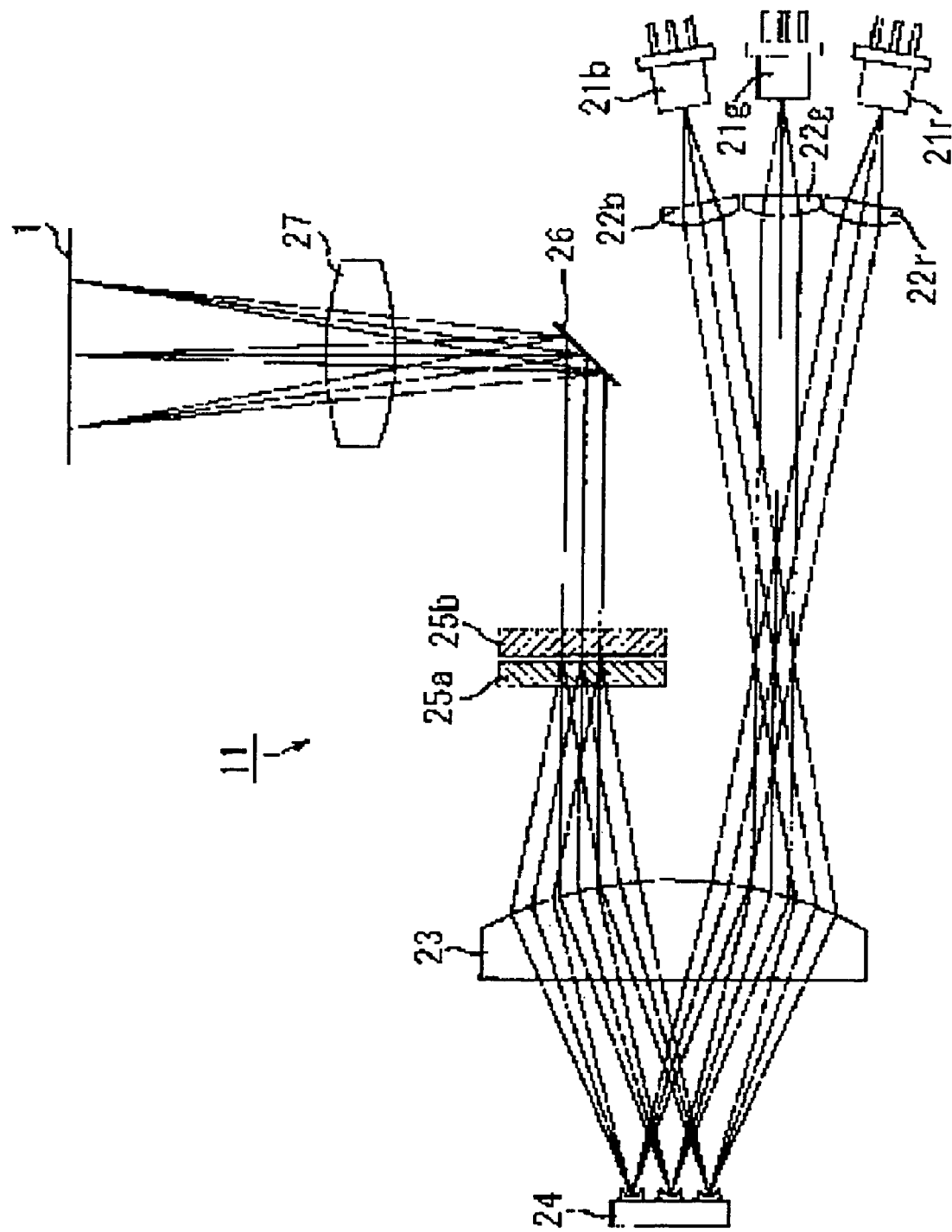
FIG. 3 is a schematic configuration diagram describing the configuration of a diffraction grating projector apparatus.

As shown in FIG. 3, the diffraction grating projector apparatus 11 comprises a first laser oscillator 21r, a second laser oscillator 21g, and a third laser oscillator 21b, as light sources for red-colored light, blue-colored light, and green-colored light, respectively. In the following description, the first through third laser oscillators 21r, 21g, and 21b, may be collectively referred to as simply "laser oscillators 21". The laser oscillators 21 can be configured of semiconductor laser devices or solid-state laser devices, for example. The laser light cast from the first through third laser oscillators 21r, 21g, and 21b, are narrow-band tricolor wavelength band light consisting of red laser light of 642 nm in wavelength, green laser light of 532 nm in wavelength, and blue laser light of 457 nm in wavelength, respectively.

Also, at the diffraction grating projector apparatus 11, a red collimator lens 22r, a green collimator lens 22g, and a blue collimator lens 22b, are respectively placed on the optical path of the beams emitted from the laser oscillators 21. The collimator lenses will be collectively referred to simply as "collimator lenses 22". The light emitted from the laser oscillators 21 is changed into parallel rays by the collimator lenses 22, and cast into a cylindrical lens 23. The light cast into the cylindrical lens 23 is concentrated on a GLV 24 by the cylindrical lens 23.

That is to say, with the diffraction grating projector apparatus 11, light is not used from a single light source, rather, a light source is provided wherein light of three colors is each independently emitted by the laser oscillators 21. Also, the diffraction grating projector apparatus 11 is arranged such that the light emitted from the laser oscillators 21 is directly cast into the cylindrical lens 23 through the collimator lenses 22.

Now, the GLV 24 will be described. First, the GLV principle will be described. The GLV has multiple minute ribbons formed on a substrate by various types of semiconductor manufacturing techniques. Each of the ribbons can be raised or lowered by piezoelectric devices or the like. With a GLV configured thus, the height of each ribbon is dynamically driven, and by casting light of a predetermined wavelength band thereupon, the overall configuration makes up phase diffraction grating. That is, upon irradiation of light thereupon, the GLV generates±first-order (or higher order) diffracted light.

Accordingly, by irradiating light upon such a GLV and shielding zero-order diffracted light, the diffracted light can be made to pulse by driving each of the ribbons of the GLV up and down, thereby displaying an image.

For example, various types of display devices have been proposed which display images using the above-described properties of GLVs. With such display devices, regarding displaying of a configuration increment (hereafter referred to as "pixel") of a two-dimensional image to be displayed, one pixel is displayed with around six ribbons. Also, sets of ribbons equivalent to one pixel have adjacent ribbons thereof raised or lowered alternately.

However, if each of the ribbons of the GLV can be independently wired and each independently driven, an arbitrary one-dimensional phase distribution can be generated. A GLV configured in this way can be considered to be a reflective one-dimensional phase spatial modulator.

Figure 4:
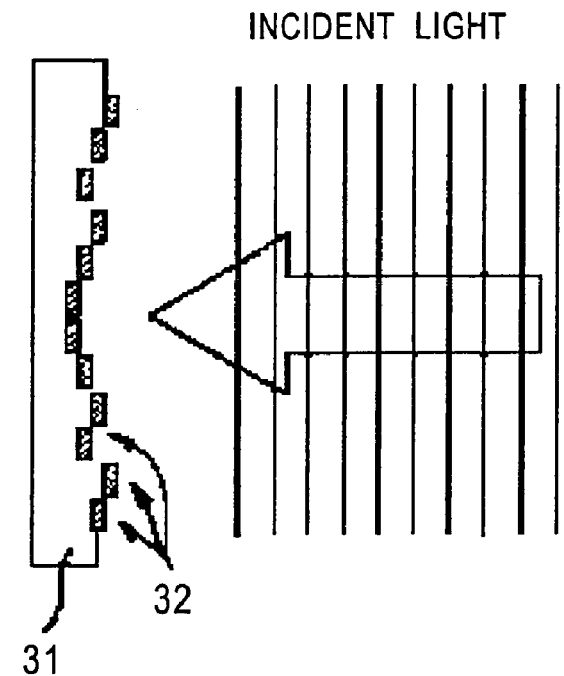
FIG. 4 is a conceptual diagram illustrating the state of light entering a GLV.

In the event that a GLV is configured as a reflective one-dimensional phase spatial modulator, arbitrary phase distributions are generated by independently driving each of the ribbons 32 of the GLV 31, as shown in FIG. 4. Casting light of a predetermined wavelength band with the phase thereof aligned to the GLV 31 as indicated by the arrow in FIG. 4 causes the incident light to be modulated and reflected, thereby generating an arbitrary one-dimensional wavefront as shown in FIG. 5.

Figure 6:
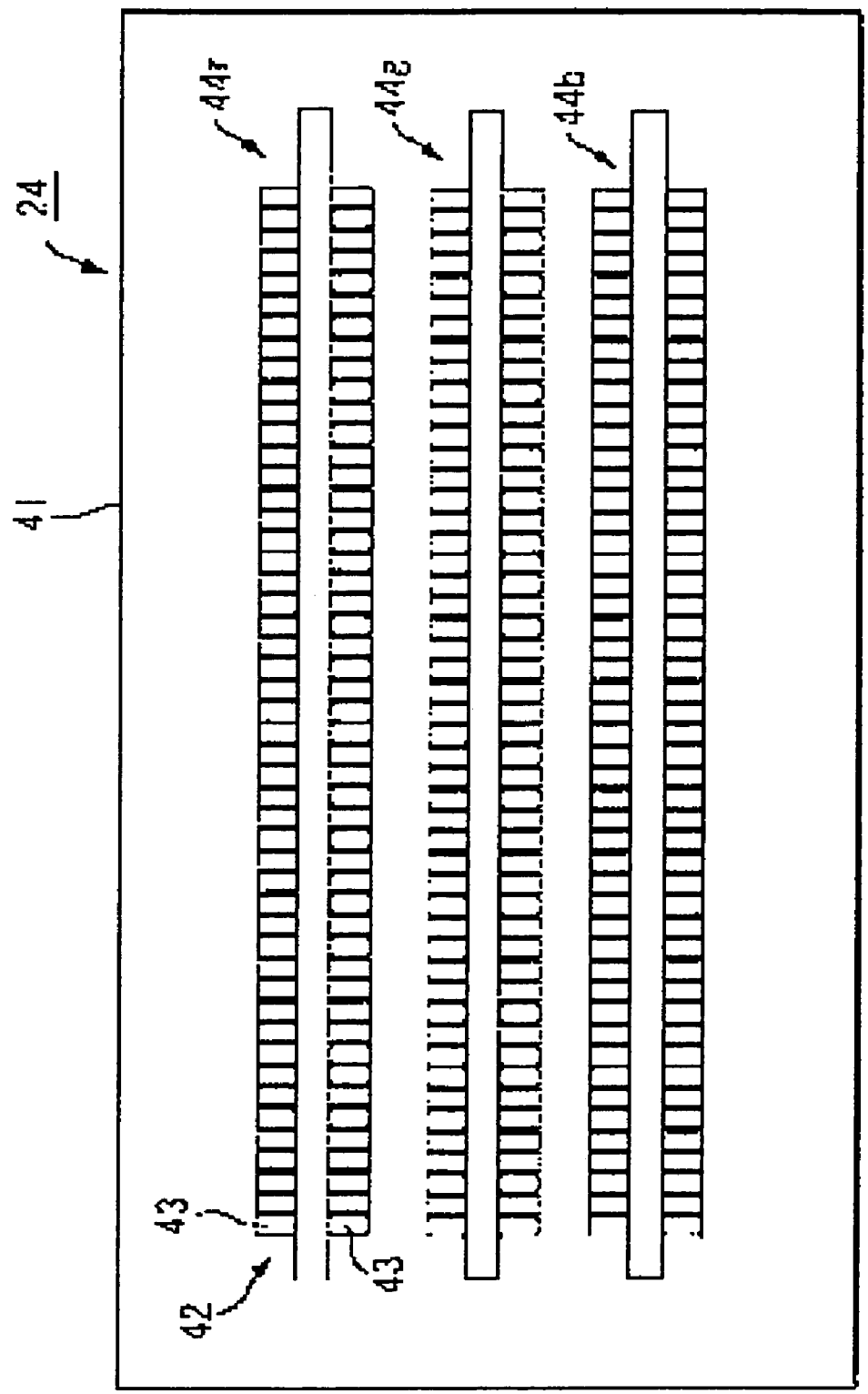
FIG. 6 is a plan view of a configuration example of a GLV.

A GLV 24 configured based on this principle has multiple minute ribbons 42 formed on a substrate 41, as shown in FIG. 6. Each of the ribbons 42 has a driving unit 43 configured of electric circuits and wiring and the like for driving, and can be driven so as to be raised or lowered as to the main face of the substrate 41 by the driving units 43.

Each of the ribbons 42 of the GLV 24 is disposed one-dimensionally, forming a ribbon row. Multiple ribbon rows are disposed for each wavelength band of light to be cast thereupon. Specifically, in the example shown in FIG. 6 for example, the GLV 24 is arranged for the three colors of light, which are red light, green light, and blue light, to be cast thereupon, and a red ribbon row 44r, green ribbon row 44g, and blue ribbon row 44b are arrayed in parallel positions where these lights are cast in. Hereafter, the ribbon rows 44r, 44g, and 44b, will be collectively referred to simply as ribbon rows 44. Now, while an ideal arrangement wherein the red ribbon row 44r, green ribbon row 44g, and blue ribbon row 44b are arrayed on the same face has been described, these do not necessarily have to be on the same face as long as the positional relation is maintained parallel, and normally are disposed on separate faces.

Figure 5:
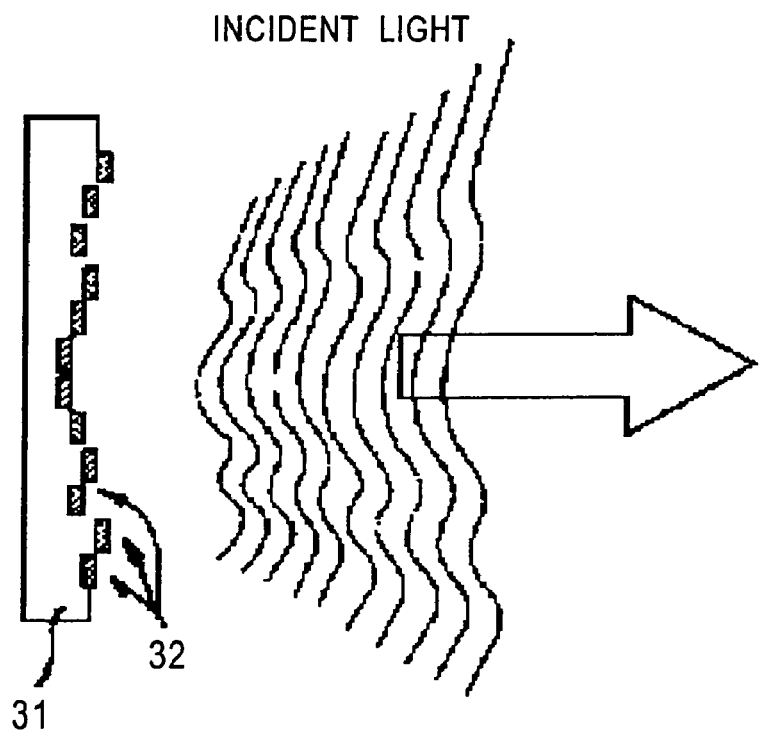
FIG. 5 is a conceptual diagram illustrating the state of reflected light at a GLV.

The ribbon rows 44 are formed so that each of the ribbons 42 can be independently driven, and as described from FIG. 4 and FIG. 5, capable of generating arbitrary phase distributions. Accordingly, the GLV 24 is capable of generating one-dimensional wavefronts independently for each of the incident red light, green light, and blue light, with the respective red ribbon row 44r, green ribbon row 44g, and blue ribbon row 44b.

Accordingly, the GLV 24 spatially modulates each of the three colors of incident light by the red ribbon row 44r, green ribbon row 44g, and blue ribbon row 44b, and reflects these as arbitrary one-dimensional wavefronts. That is to say, the GLV 24 functions as a spatial modulator in the display device 30.

The GLV configured in this way can be manufactured in minute sizes using various types of semiconductor manufacturing techniques, and can be operated at extremely high speeds. Accordingly, these can be used as spatial modulators in image display devices, for example. Also, the GLV has ribbon rows 44 for each wavelength band light to be converted, and these ribbon rows 44 are integrally provided on the substrate 41, so in the event that this is used as a spatial modulator in an image display device, not only can the number of parts be reduced, but also positioning ribbon rows for each wavelength band light becomes unnecessary.

Also, with the diffraction grating projector apparatus 11 the light modulated and reflected by the GLV 24 is cast into the cylindrical lens 23 again and is formed into parallel light by the cylindrical lens 23. A first volume hologram device 25a and a second volume hologram device 25b are provided on the optical path of the light formed into parallel light by the cylindrical lens 23.

The first and second volume hologram devices 25a and 25b act to diffract the red light WR by the first volume hologram device 25a, and also diffract the blue light WB in the same direction as the red light WR by the second volume hologram device 25b, for example. The first and second volume hologram devices 25a and 25b do not diffract the green light WG but allow this to proceed straight and be transmitted, and be emitted in the same direction as the red light WR. Thus, the light of three colors modulated by the GLV 24 is coupled and emitted in a certain direction. That is to say, with the diffraction grating projector apparatus 11, the first and second volume hologram devices 25a and 25b make up a optical coupler mechanism.

The light coupled by the first and second volume hologram devices 25a and 25b is scanned in a predetermined direction by a galvano mirror 26, and is projected to a projector screen 1 through a projecting lens 27. Thus, the diffraction grating projector apparatus 11 is configured so as to display an image displayed in color on the projector screen 1.

As described above, with the projector screen 1 to which the present invention has been applied, the narrow-band tricolor wavelength band light from the diffraction grating projector apparatus 11 is cast into the optical thin film 3 through the protective film 5 and light diffusing layer 4, and is reflected by the optical thin film 3. The reflected light is cast into the light diffusing layer 4 again, diffused at a predetermined ratio, and passes through the protective layer 5 as diffused reflected light and is cast out. Also, the reflected light which was not diffused at the light diffusing layer 4 is cast out through the protective layer 5 as reflected specular components. Accordingly, the reflected specular components and scattered reflected light exist as the reflected light from the projector screen 1, so even in the event that the observer views a different direction from the direction parallel with the direction of the reflected specular components, the scattered reflected light can be viewed, thereby having excellent visibility.

Also, the reflected specular components and the scattered reflected light are light reflected at the optical thin film 3, and light of predetermined wavelength bands, i.e., narrow-band tricolor wavelength light, is selectively reflected at the optical thin film 3, so the reflected specular components and the scattered reflected light are also approximately narrow-band tricolor wavelength light. Accordingly, even in the event that external light is cast onto the projector screen 1, light other than the narrow-band tricolor wavelength light does not become reflected light, so deterioration of contrast due to external light and effects of external light can be effectively reduced, and a bright image can be obtained. As a result, with the projector screen 1, a clear image can be obtained even in the event that the projection environment is bright, and a clear image can be provided unaffected by the brightness of the projection environment.

Also, the projection screen according to the present invention is not restricted to narrow-band tricolor wavelength band light as the light source for projection, and can also use light having a wavelength band wherein there is a certain width in the wavelength, and in this case, the optical thickness nd of each layer of the dielectric multi-layer film preferably satisfies the conditions of the following Expression (12) as to the primary wavelength λp of the wavelength band light.

$$nd = \lambda p(a \pm \tfrac{1}{4}) \text{ (a is a natural number)} \quad (12)$$

This indicates the structure of the multi-layered film of the narrow-band tricolor wavelength band light can be configured in he same way for other wavelength band light by substituting the primary wavelength λp thereof, so sufficient selectability of transmitted light and reflected light can be obtained in the same way.

EMBODIMENTS

The following is a detailed description of the present invention based on specific embodiments. Note that the present invention is not restricted to the following embodiments; rather, various modifications can be made without departing from the scope of the invention.

[First Embodiment]

For the first embodiment, as a projection screen according to the present invention, a diffraction grating projector screen having an optical thin film functioning as a narrow-band tricolor wavelength band filter was configured. This diffraction grating projector screen can be used for projection with the diffraction grating projector shown in FIG. 3 described above, for example.

The diffraction grating projector screen 51 was fabricated by preparing a screen base 52 formed of black PET 500 μm in thickness as a screen base, and forming an optical thin film 53 of a dielectric multi-layer film on one side of the screen base 52.

Figure 7:
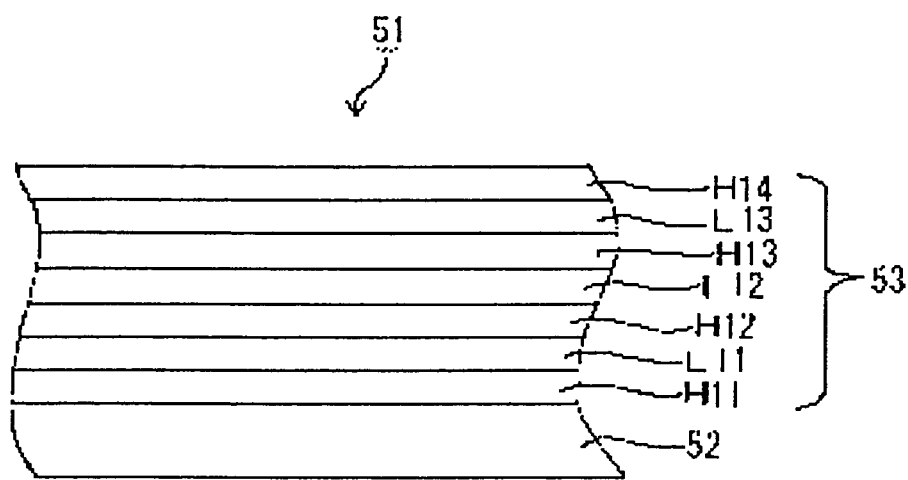
FIG. 7 is a cross-sectional diagram illustrating the configuration of a projector screen according to a first embodiment.

The optical thin film 53 was formed as a dielectric multi-layer film, and was formed by alternately layering the seven layers of high-refractive-index layers H11 through H14 which are dielectric thin films formed of high-refractive-index material, and low-refractive-index layers L11 through L13 which are dielectric thin films formed of low-refractive-index material, by sputtering, as shown in FIG. 7. With the present embodiment, the refractive index of the high-refractive-index layer was set relatively high from the perspective of reducing residual transmissivity at the tricolor wavelengths of the blue wavelength, green wavelength, and red wavelength, and specifically, the refractive index of the high-refractive-index layers was made to be 2.4 by forming with zinc sulfide (ZnS). Also, the low-refractive-index layers were formed with magnesium fluoride ($MgF_2$), and the refractive index of the low-refractive-index layers was set to 1.4.

The dielectric multi-layer film was configured with the optical thickness thereof satisfying the following Expression (13) as to the wavelength λ of the wavelength band light for each output light from the narrow-band tricolor light source, with the refractive index of each layer of the dielectric multi-layer film as n, and the thickness of each layer as d, to form an optical thin film 53.

$$nd = \lambda(a \pm \tfrac{1}{4}) \text{ (a is a natural number)} \quad (13)$$

The following is the formation conditions of the optical thin film 53 fabricated according to the first embodiment.

Optical Thin Film Formation Conditions
Refractive index of high-refractive-index layers: $n_H = 2.4$
Refractive index of low-refractive-index layers: $n_L = 1.4$
Thickness of high-refractive-index layers: $d_H = 611$ nm
Thickness of low-refractive-index layers: $d_L = 1047$ nm
Number of high-refractive-index layers: 4 layers
Number of low-refractive-index layers: 3 layers
Refractive index of vacuum (air): $n_0 = 1$
Refractive index of screen base: $n_g = 1.49$
Optical thickness: $n_d = 1.467$ μm The spectral transmissivity properties for S polarization and P polarization in the range of the wavelength band of 400 nm to 700 nm was measured for a projector screen manufactured as described above. The incident angle of light to the screen was 15°. The results are shown in FIG. 8.

Figure 8:
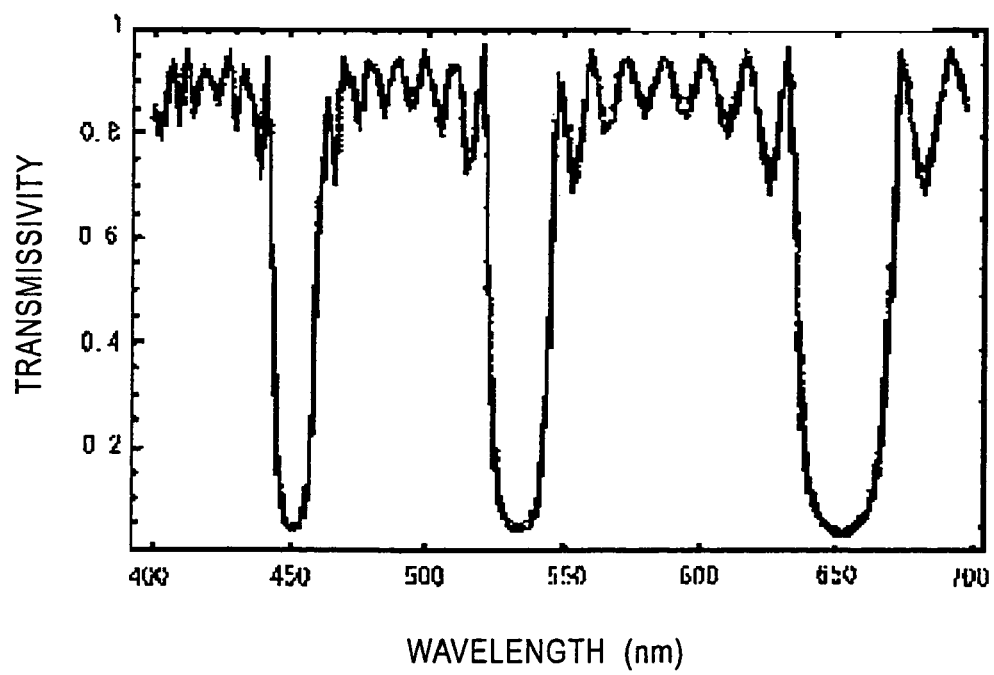
FIG. 8 is a properties diagram illustrating the transmissivity properties of the projector screen according to the first embodiment.

As can be understood from FIG. 8, the transmissivity of light of the blue wavelength (around 450 nm), green wavelength (around 540 nm), and red wavelength (around 650 nm) is very low, while light of other wavelengths show high transmissive properties. This shows that light of the blue wavelength, green wavelength, and red wavelength is being effectively reflected by the optical thin film 53, such that the light of the blue wavelength, green wavelength, and red wavelength is being selectively reflected by the projector screen 51 according to the present embodiment, and light of other wavelengths is being selectively transmitted. With this projector screen 51, a screen base 52 formed of black PET is used with this projector screen 51, and the screen base 52 functions as a light absorbing layer, so light which has passed through the optical thin film 53 is absorbed by the screen base 52 and does not reflect.

That is to say, with the projector screen 51, only the light of the blue wavelength, green wavelength, and red wavelength is obtained as reflected light, so reflection of external light can be markedly suppressed as compared to normal screens, and accordingly deterioration of contrast of the image formed on the projector screen 51 and influence of external light can be effectively reduced, and a bright image can be obtained. Accordingly, with the present embodiment, it can be said that a projector screen can be realized which has high contrast and is capable of yielding a clear image unaffected by the brightness of the projection environment.

Also, normally, forming a thin film on the screen narrows the field of view, but according to the above-described results, suitable results are obtained even in the event that the incident angle is not 0°, i.e., perpendicular to the screen, and accordingly it can be understood that a projector screen with a great degree of freedom regarding incident light to the projector screen, which has excellent usability, can be realized.

Also, of the above-described conditions, the optical thickness nd of the dielectric thin films was changed by changing the thickness of each of the dielectric thin films making up the optical thin film 53, the average transmissivity (%) thereof was measured, and the optimal range for the optical thickness nd was studied. The results thereof are shown in FIG. 9.

Figure 9:
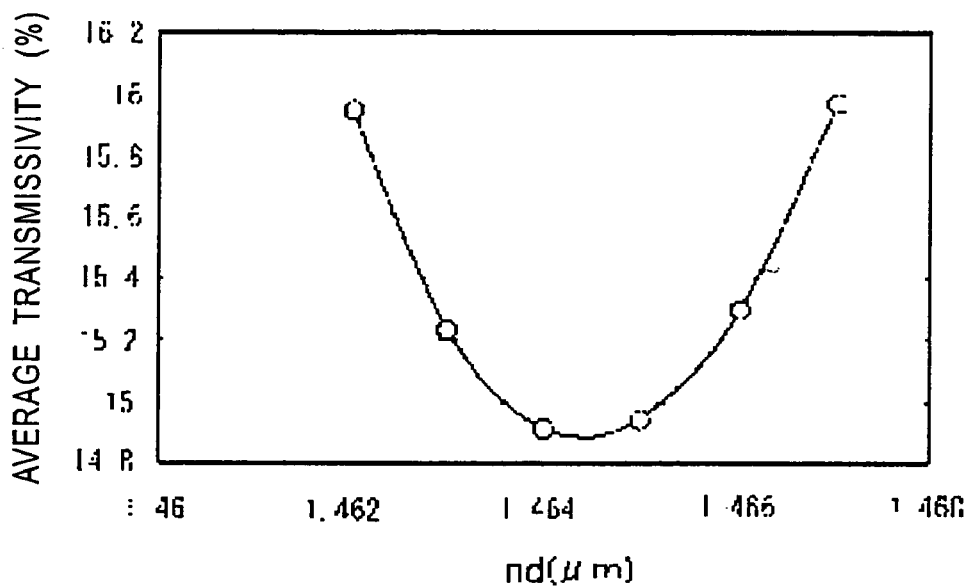
FIG. 9 is a properties diagram illustrating the relation between the optical thickness nd and average transmissivity.

From the results in FIG. 9, it can be understood that suitable average transmissivity is obtained in the range of 1.462 μm to 1.467 μm for the optical thickness nd of the dielectric thin films, and accordingly that the optimal range for the optical thickness nd of the dielectric thin films is 1.462 μm to 1.467 μm.

[Second Embodiment]

For the second embodiment, a projector screen was manufactured in the same way as with the first embodiment, other than forming the high-refractive-index layers of titanium oxide ($TiO_2$) such that the high-refractive-index layers have a refractive index of 2.7, and forming the high-refractive-index layers to a thickness of 543 nm. The following is the formation conditions of the optical thin film fabricated according to the second embodiment.

Optical Thin Film Formation Conditions
Refractive index of high-refractive-index layers: $n_H=2.7$
Refractive index of low-refractive-index layers: $n_L=1.4$
Thickness of high-refractive-index layers: $d_H=543$ nm
Thickness of low-refractive-index layers: $d_L=1047$ nm
Number of high-refractive-index layers: 4 layers
Number of low-refractive-index layers: 3 layers
Refractive index of vacuum (air): $n_0=1$
Refractive index of screen base: $n_g=1.49$
Optical thickness: $n_d=1.467$ μm The spectral transmissivity properties for S polarization and P polarization in the range of the wavelength band of 400 nm to 700 nm was measured for a projector screen manufactured as described above, as with the first embodiment. The incident angle of light to the screen was 15°. The results are shown in FIG. 10.

Figure 10:
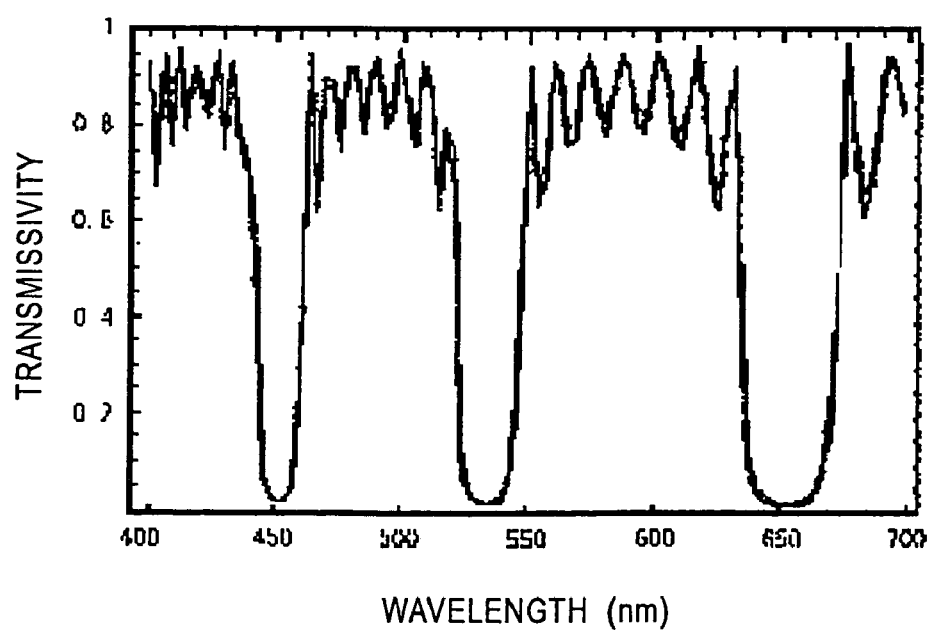
FIG. 10 is a properties diagram illustrating the transmissivity properties of the projector screen according to a second embodiment.

As can be understood from FIG. 10, the transmissivity of light of the blue wavelength, green wavelength, and red wavelength is even lower than with the first embodiment, i.e., the residual transmissivity of the light of the blue wavelength, green wavelength, and red wavelength is even lower. This shows that light of the blue wavelength, green wavelength, and red wavelength is being reflected even more effectively. On the other hand, it can be understood that the transmissivity of the high-transmissivity band around the yellow wavelength is somewhat lower than with the first embodiment. This means that the transmissivity of the high-transmissivity band around the yellow wavelength is somewhat lower than with the first embodiment.

These facts indicate that adjusting the refractive index of the high-refractive-index layers in a 7-layer structure the same as with the first embodiment allows the properties of the optical thin film to be changed, and by setting the refractive index of the high-refractive-index layers to a high value around 2.7 for example, the reflectivity of the light of the blue wavelength, green wavelength, and red wavelength can be made even better, so an even brighter image can be obtained.

Accordingly, taking the results of the first embodiment into consideration as well, it can be said that by setting the refractive index of the high-refractive-index layers to 2.4 or higher, a projector screen can be realized which selectively reflects light of the blue wavelength, green wavelength, and red wavelength and selectively transmits light of other wavelengths, which has high contrast, and which is capable of yielding a clear image unaffected by the brightness of the projection environment. The refractive index of the high-refractive-index layers can be set as high as around 2.7 for example, according to the purpose of use.

Also, the incident angle of light was set to 15° for the present embodiment as with the first embodiment, and accordingly it can be understood that a projector screen with a great degree of freedom regarding incident light to the projector screen, which has excellent usability, can be realized.

[Third Embodiment]

Figure 11:
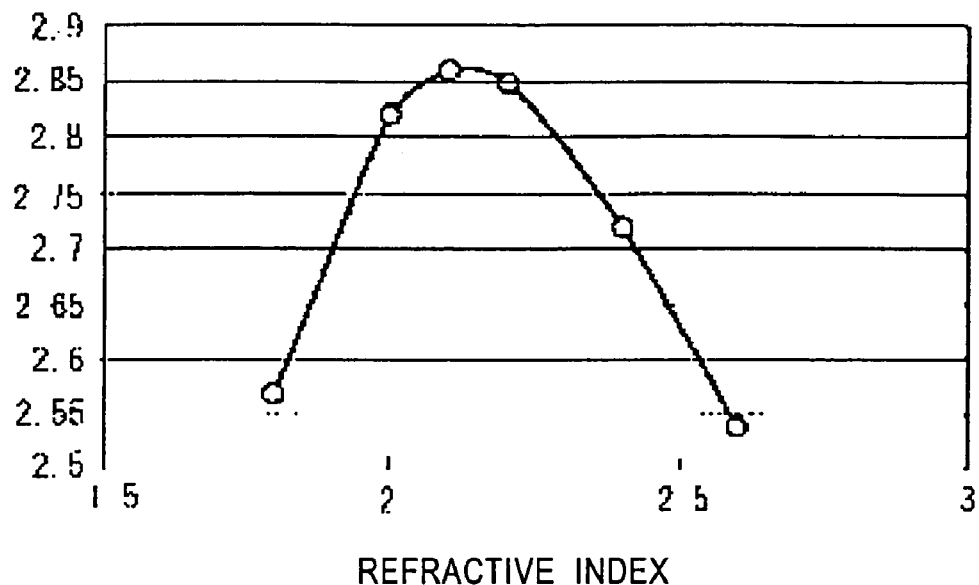
FIG. 11 is a properties diagram illustrating the relation between the average transmissivity of residual transmissivity and visual light band, and the refractive index.

While the first embodiment and second embodiment had the refractive index of the high-refractive-index layers set high from the perspective of reducing the residual transmissivity of light of the blue wavelength, green wavelength, and red wavelength, i.e., from the perspective of raising the reflectivity of the light of the blue wavelength, green wavelength, and red wavelength, the average transmissivity at other wavelength bands drops somewhat. Accordingly, studying the refractive index where the ratio of the residual transmissivity and the average transmissivity of the visual light band is maximal, the solution of the refractive index where the ratio of the residual transmissivity and the average transmissivity of the visual light band is maximal for a 7-layer configuration as with the first embodiment and second embodiment exists around 2.1 to 2.2 for the refractive index of the high-refractive-index layers, as shown in FIG. 11. In FIG. 11, the vertical axis shows the ratio of the residual transmissivity and the average transmissivity of the visual light band.

Accordingly, for the third embodiment, a projector screen was manufactured in the same way as with the first embodiment, other than forming the high-refractive-index layers of cerium oxide ($CeO_2$) such that the high-refractive-index layers have a refractive index of 2.1, and forming the high-refractive-index layers to a thickness of 698 nm. The following is the formation conditions of the optical thin film fabricated according to the third embodiment.

Optical Thin Film Formation Conditions
Refractive index of high-refractive-index layers: $n_H=2.1$
Refractive index of low-refractive-index layers: $n_L=1.4$
Thickness of high-refractive-index layers: $d_H=698$ nm
Thickness of low-refractive-index layers: $d_L=1047$ nm
Number of high-refractive-index layers: 4 layers
Number of low-refractive-index layers: 3 layers
Refractive index of vacuum (air): $n_0=1$
Refractive index of screen base: $n_g=1.49$
Optical thickness: $n_d=1.467$ μm The spectral transmissivity properties for S polarization and P polarization in the range of the wavelength band of 400 nm to 700 nm was measured for a projector screen manufactured as described above, as with the first embodiment. The incident angle of light to the screen was 15°. The results are shown in FIG. 12.

Figure 12:
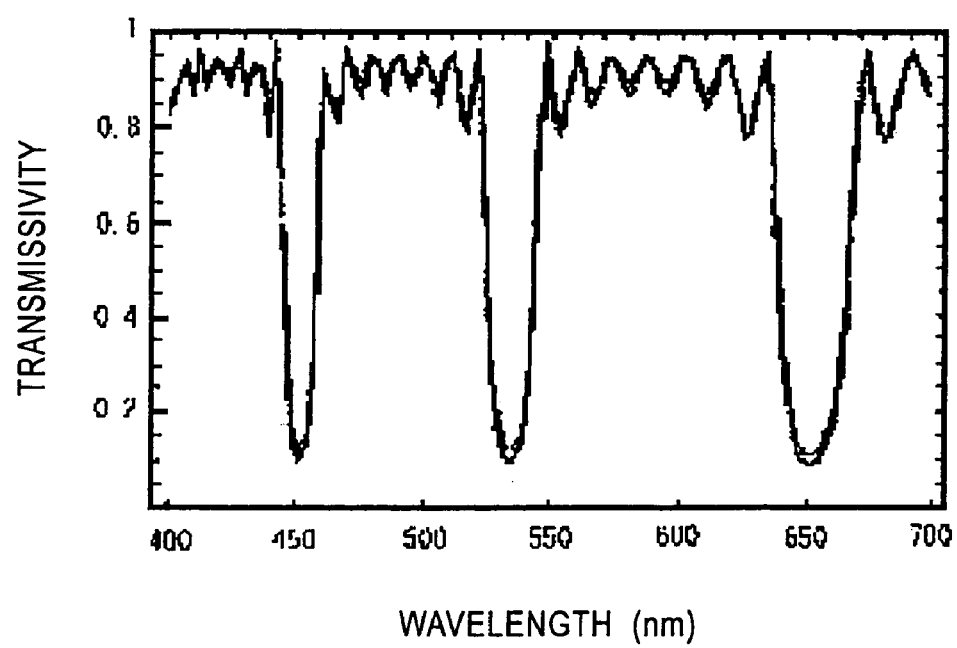
FIG. 12 is a properties diagram illustrating the transmissivity properties of the projector screen according to a third embodiment.

As can be understood from FIG. 12, the transmissivity of light of the blue wavelength, green wavelength, and red wavelength is somewhat higher than with the first embodiment, but still exhibits sufficiently low values. That is to say it can be understood that this indicates good reflective properties with regard to the light of the blue wavelength, green wavelength, and red wavelength. Also, at wavelength bands other than these, good transmissive properties are obtained even in comparison with the first embodiment and second embodiment. This shows that light of the blue wavelength, green wavelength, and red wavelength is being selectively reflected by the projector screen according to the present embodiment, and light of other wavelengths is being effectively transmitted.

Also, with the present embodiment, the width of the shielded bands, i.e., the reflection bands for the light of the blue wavelength, green wavelength, and red wavelength is narrower, as shown in FIG. 12. This indicates that only light of narrower wavelength bands is reflected, and is preferable since contrast can be improved even further.

Thus, according to the present embodiment, it can be said that a projector screen can be realized wherein the contrast is high and a clear image can be obtained unaffected by the brightness of the projection environment.

Also, the incident angle of light was set to 15° for the present embodiment as with the first embodiment, and accordingly it can be understood that a projector screen with a great degree of freedom regarding incident light to the projector screen, which has excellent usability, can be realized.

As described above, using the optical thin film according to the first embodiment through the third embodiment allows a projector screen to be realized which has high reflectivity at the tricolor wavelength bands, and has high transmissivity at other wavelength bands.

[Fourth Embodiment]

Figure 13:
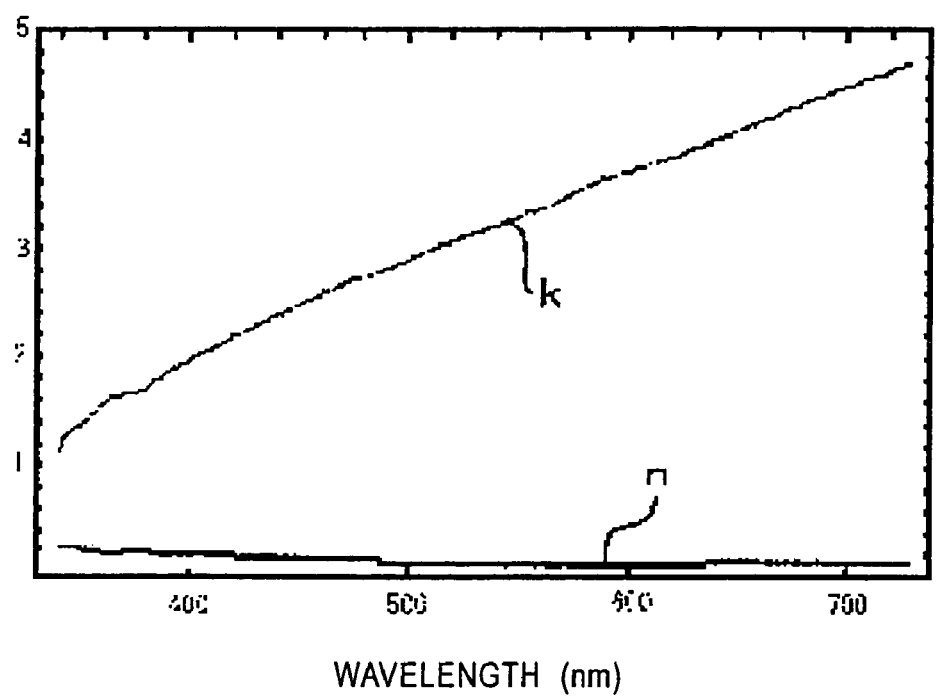
FIG. 13 is a properties diagram illustrating the complex refraction of silver.

With the fourth embodiment, a light diffusing layer having spectral scattering properties using spherical silver particles as metal fine particles, and a projector screen using the same, were studied. First, the real part n of the complex refractive index of silver, i.e., the refractive index and the imaginary part k, i.e., the value of the extinction coefficient, is as shown in FIG. 13. In FIG. 13, the vertical axis represents the value of the real part n and imaginary part k, and the horizontal axis represents the wavelength.

Figure 14:
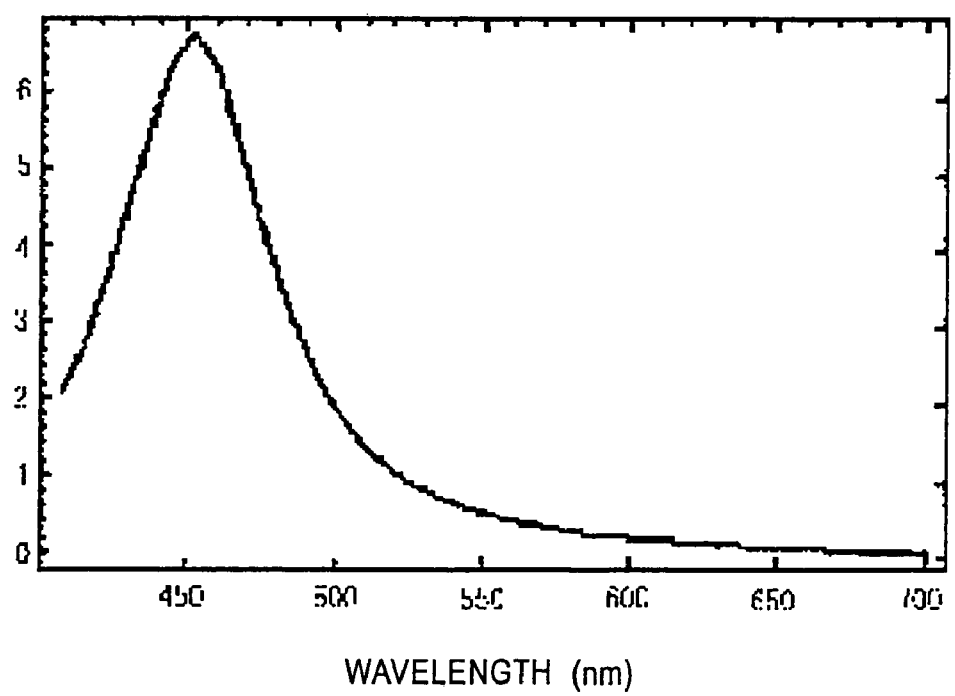
FIG. 14 is a properties diagram illustrating the scattering efficiency of a single spherical silver particle.

Now, in the event that spherical silver particles 25 nm in radius are dispersed in a medium of which the refractive index is 1.49, the scattering efficiency obtained by dividing the scattering cross-sectional area with the projection area is as shown in FIG. 14. The scattering efficiency was calculated by Mie scattering using complex refractive index with regard to one spherical silver particle.

In FIG. 14, the vertical axis represents the scattering efficiency, i.e., how many times the projection area that scattering is effected. It can be understood from FIG. 14 that the scattering efficiency is maximum at the wavelength of 457 nm, and can scatter light around approximately seven times the projection area.

Figure 15:
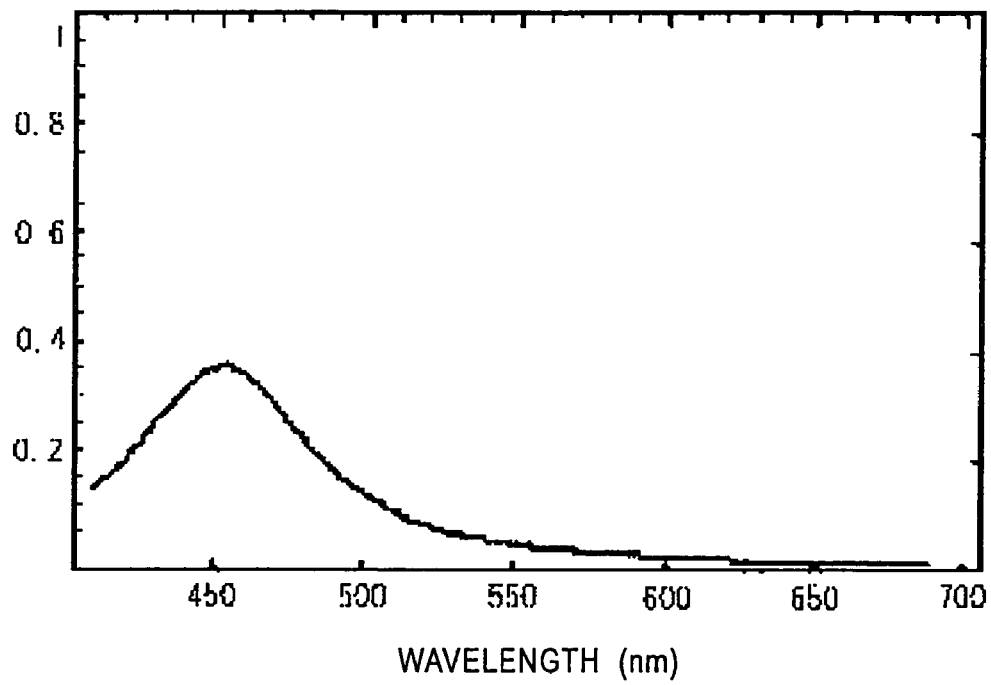
FIG. 15 is a properties diagram illustrating the relation between wavelength and scattering coefficient in the event of multiple scattering of spherical silver particles.

Next, the spherical silver particles were dispersed in a similar medium so that the number density was $3 \times 10^{10}$ particles/cm$^3$, and a diffusion film was formed. The thickness of the diffusion film was made to be around 775 μm. The scattering coefficient for multiple scattering with the diffusion film formed thus was studied. The results thereof are shown in FIG. 15. In FIG. 15, the vertical axis represents the scattering coefficient. As shown in FIG. 15, the peak scattering coefficient is around the wavelength of 450 nm, i.e., in the blue wavelength band, where it is 0.4. This means that 40% of the light is scattered. Thus, it can be said that a light diffusing layer having wavelength selectiablity wherein light of the blue wavelength band can be selectively scattered can be realized by dispersing spherical silver particles of 25 nm in radius in a medium having a refractive index of 1.49. Now, the factor that affects the peak scattering coefficient is the weight of the spherical silver particles per unit area rather than the number density of the spherical silver particles or the thickness of the diffusing film, and in this case is 1.5 mg/ft$^2$, i.e., 0.135 mg/m$^2$.

Figure 16:
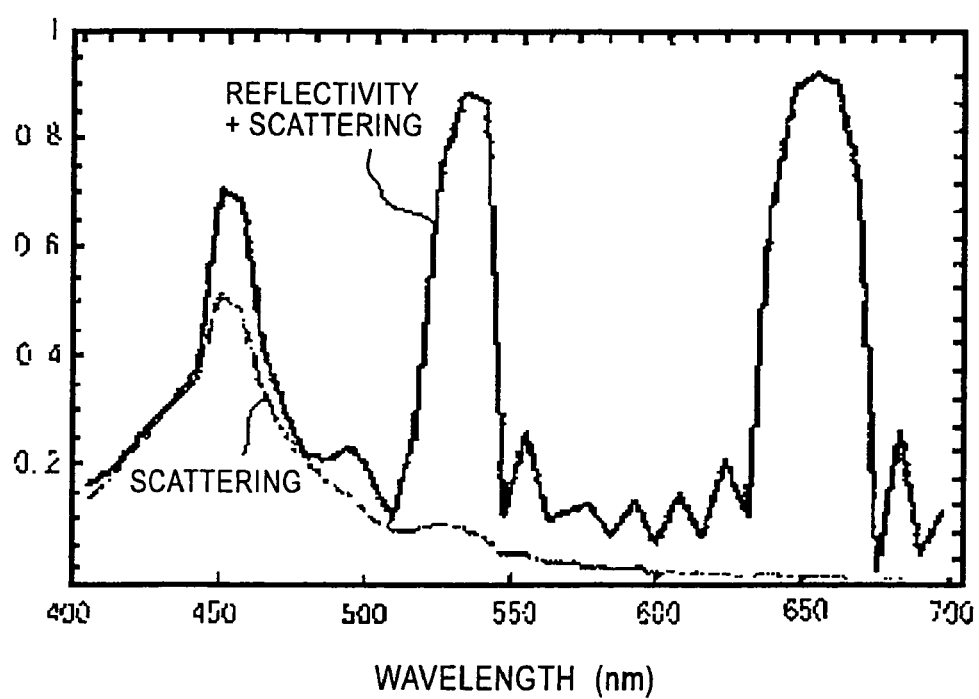
FIG. 16 is a properties diagram illustrating the relation between: scattering, and the total of scattering and reflectivity; and the wavelength, with a projector screen according to a fourth embodiment.

Next, the results of studying disposing this diffusing film on the optical thin film 53 of the projector screen 51 in the first embodiment are as shown in FIG. 16, and it can be understood that the scattering of the light in the blue wavelength band is improved over that in other wavelength bands. Accordingly, it can be said that by providing the above-described light diffusing layer on the optical thin film 53 of the projector screen 51 in the first embodiment, a projector screen can be realized which has good scattering properties in the blue wavelength band and excellent visibility. Note that the vertical axis in FIG. 16 represents the scattering and the sum of scattering and reflectivity.

[Fifth Embodiment]

Figure 17:
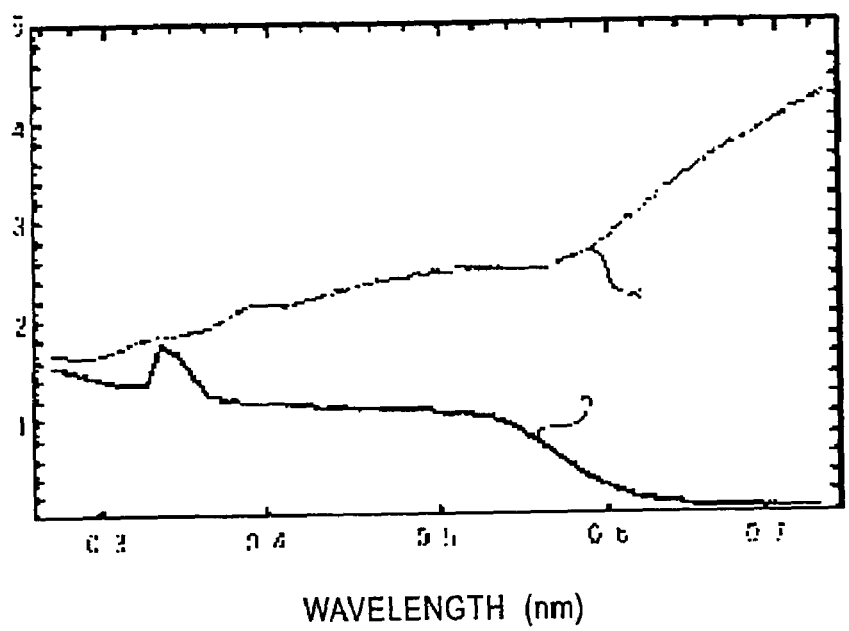
FIG. 17 is a properties diagram illustrating the complex refraction of copper.

With the fifth embodiment, a light diffusing layer having spectral scattering properties using spherical copper particles as metal fine particles, and a projector screen using the same, were studied. First, the real part n of the complex refraction of copper, i.e., the refractive index and the imaginary part k, i.e., the value of the extinction coefficient, is as shown in FIG. 17. In FIG. 17, the vertical axis represents the value of the real part n and imaginary part k, and the horizontal axis represents the wavelength.

Figure 18:
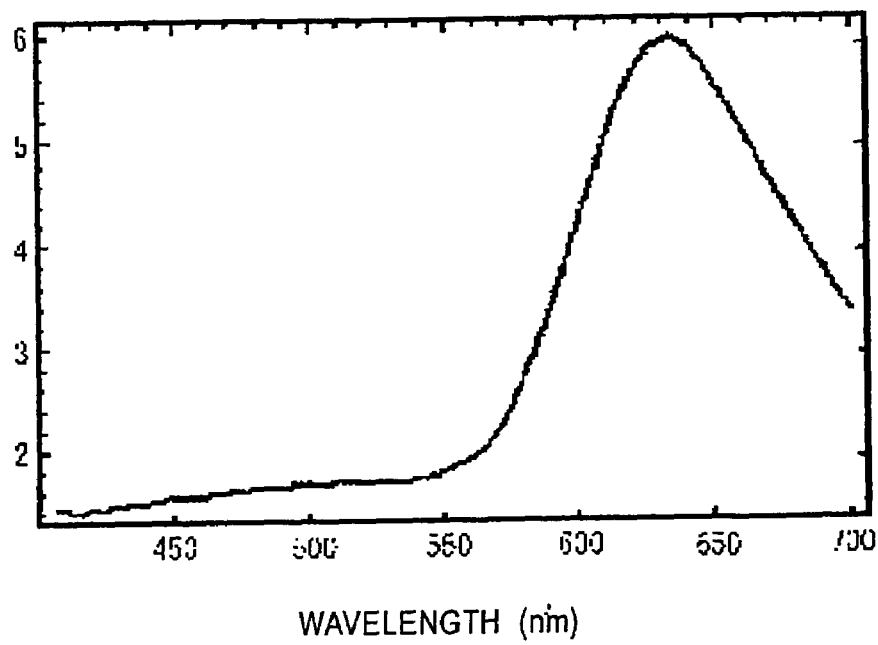
FIG. 18 is a properties diagram illustrating the scattering efficiency of a single spherical copper particle.

Now, in the event that spherical silver particles of 49 nm in radius are dispersed in a medium of which the refractive index is 1.6, the scattering efficiency obtained by dividing the scattering cross-sectional area with the projection area is as shown in FIG. 18. The scattering efficiency was calculated by Mie scattering using complex refractive index with regard to one spherical silver particle. In FIG. 18, the vertical axis represents the scattering efficiency, i.e., how many times the projection area that scattering is effected. It can be understood from FIG. 18 that the scattering efficiency is maximum at the wavelength of 632 nm, and can scatter light around approximately six times the projection area.

Figure 19:
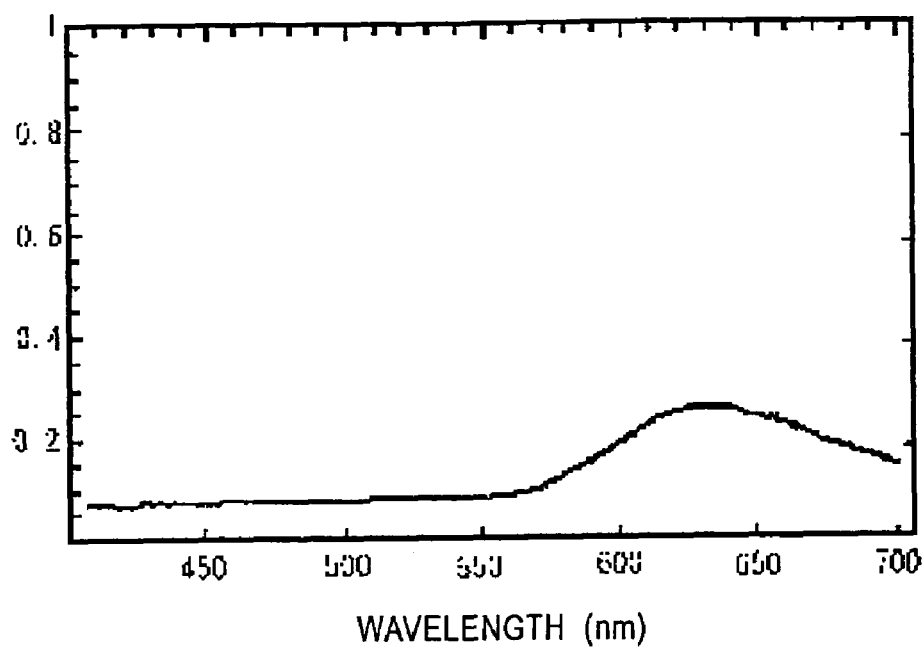
FIG. 19 is a properties diagram illustrating the relation between wavelength and scattering coefficient in the event of multiple scattering of spherical silver particles.

Next, the spherical copper particles were dispersed in a similar medium so that the number density was $0.8 \times 10^{10}$ particles/cm$^3$, and a diffusion film was formed. The thickness of the diffusion film was made to be around 550 μm. The scattering coefficient for multiple scattering with the diffusion film formed thus was studied. The results thereof are shown in FIG. 19. In FIG. 19, the vertical axis represents the scattering coefficient. As shown in FIG. 19, the peak scattering coefficient is around the wavelength of 640 nm, i.e., in the red wavelength band, where it is 0.3. This means that 30% of the light is scattered. Thus, it can be said that a light diffusing layer having wavelength selectability wherein light of the red wavelength band can be selectively scattered can be realized by dispersing spherical copper particles of 49 nm in radius in a medium having a refractive index of 1.6.

Figure 20:
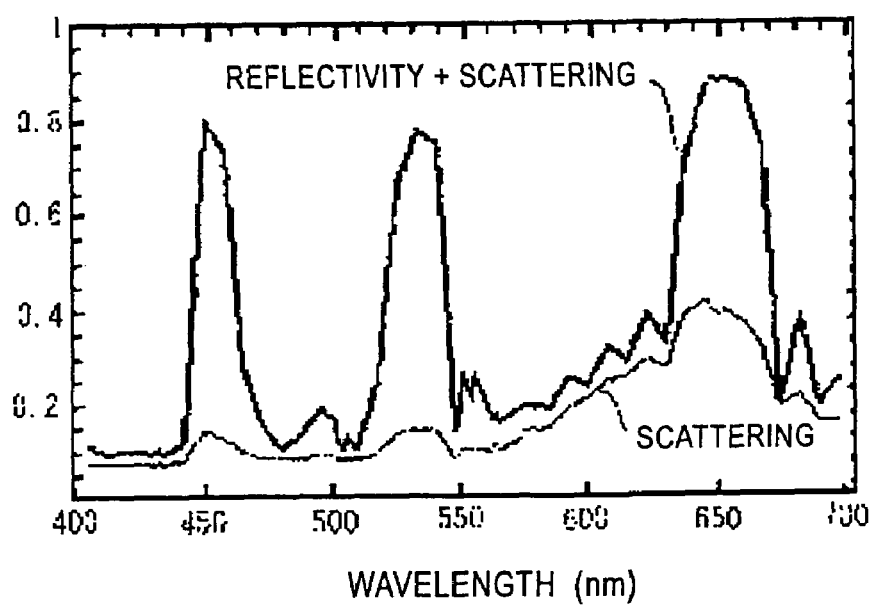
FIG. 20 is a properties diagram illustrating the relation between: scattering, and the total of scattering and reflectivity; and the wavelength, with a projector screen according to a fifth embodiment.

Next, the results of studying disposing this diffusing film on the optical thin film 53 of the projector screen 51 in the first embodiment are as shown in FIG. 20, and it can be understood that the scattering of the light in the red wavelength band is improved over that in other wavelength bands. Accordingly, it can be said that by providing the above-described light diffusing layer on the optical thin film 53 of the projector screen 51 in the first embodiment, a projector screen can be realized which has good scattering properties in the red wavelength band and excellent visibility. Note that the vertical axis in FIG. 20 represents the scattering and the sum of scattering and reflectivity.

Figure 21:
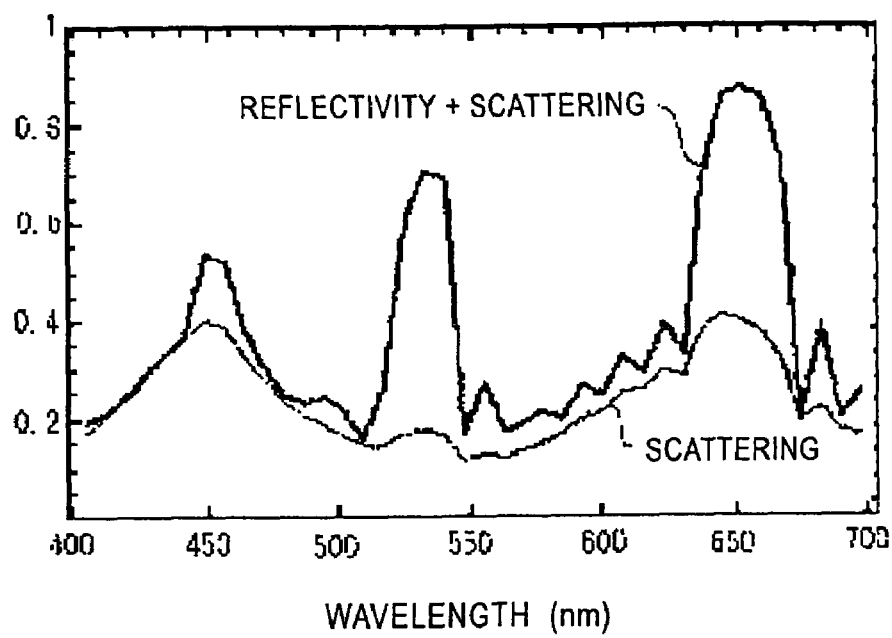
FIG. 21 is a properties diagram illustrating the relation between: scattering, and the total of scattering and reflectivity; and the wavelength, with a projector screen configured by layering the optical thin film according to the fourth embodiment and the optical thin film according to the fifth embodiment.

Also, the properties obtained by layering the light diffusing film using the spherical silver particles according to the fourth embodiment and the light diffusing film using the spherical copper particles according to the fifth embodiment are as shown in FIG. 21. It can be understood from FIG. 21 that the scattering of the light in the blue wavelength band around the wavelength of 457 nm and the red wavelength band around the wavelength of 642 nm is improved, and good visibility can be obtained.

On the other hand, it can be understood that the scattering in the green wavelength band around the wavelength of 532 nm is lower than in the blue wavelength band and the red wavelength band, and that the visibility deteriorates somewhat. In such cases, the scattering in the green wavelength band can be supplemented by using supplementary means such as described in the sixth embodiment and the seventh embodiment, thereby configuring a projector screen 51 with good balance in visibility.

[Sixth Embodiment]

Figure 22:
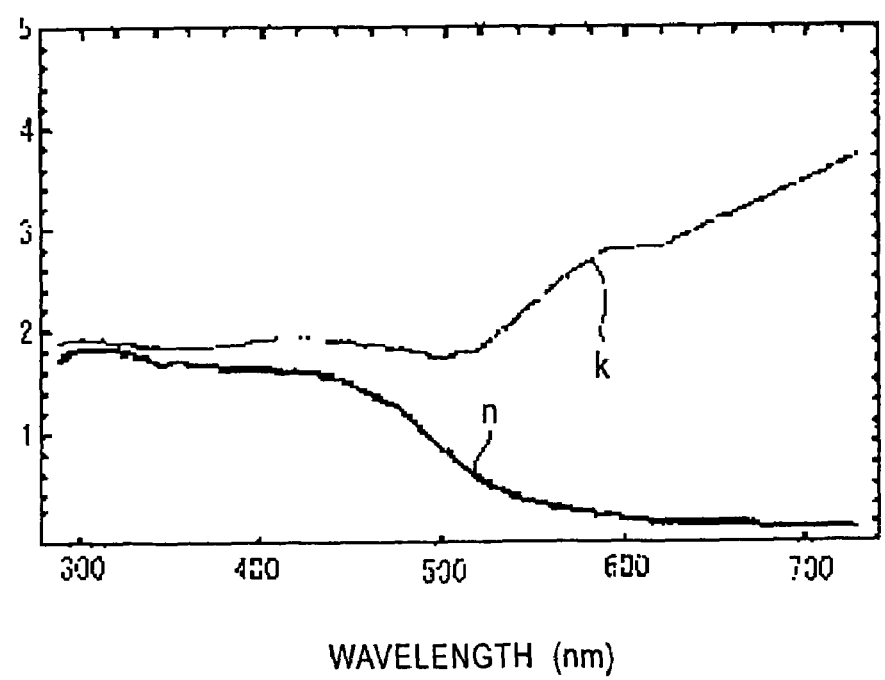
FIG. 22 is a properties diagram illustrating the complex refraction of gold.

With the sixth embodiment, a light diffusing layer having spectral scattering properties using spherical gold particles as metal fine particles, and a projector screen using the same, were studied. First, the real part n of the complex refractive index of gold, i.e., the refractive index and the imaginary part k, i.e., the value of the extinction coefficient, is as shown in FIG. 22. In FIG. 22, the vertical axis represents the value of the real part n and imaginary part k, and the horizontal axis represents the wavelength.

Figure 23:
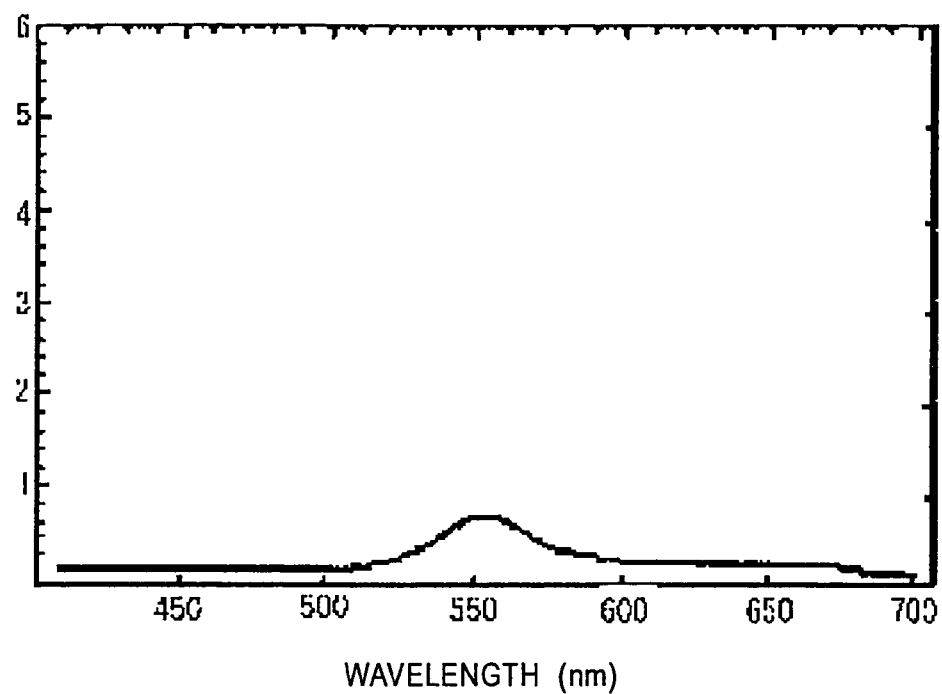
FIG. 23 is a properties diagram illustrating the scattering efficiency of a single spherical gold particle.

Now, in the event that spherical gold particles 20 nm in radius are dispersed in a medium of which the refractive index is 1.49, the scattering efficiency obtained by dividing the scattering cross-sectional area with the projection area is as shown in FIG. 23. The scattering efficiency was calculated by Mie scattering using complex refractive index with regard to one spherical gold particle. In FIG. 23, the vertical axis represents the scattering efficiency, i.e., how many times the projection area that scattering is effected. It can be understood from FIG. 23 that the scattering efficiency is maximum at the wavelength of 550 nm.

Figure 24:
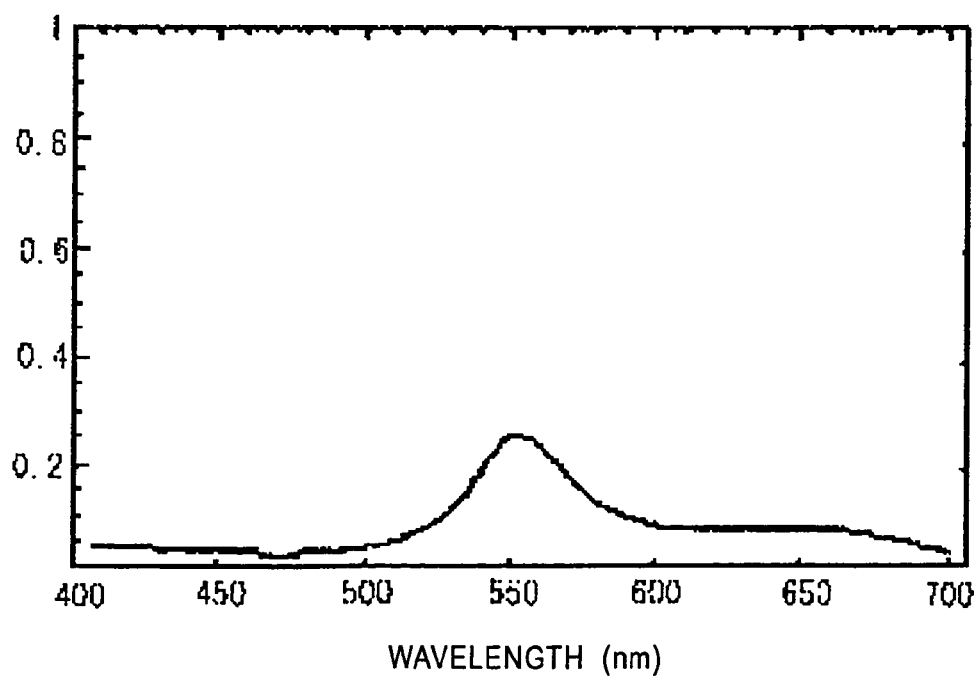
FIG. 24 is a properties diagram illustrating the relation between wavelength and scattering coefficient in the event of multiple scattering of spherical gold particles.

Next, the spherical gold particles were dispersed in a similar medium so that the number density was $5 \times 10^{11}$ particles/cm$^3$, and a diffusion film was formed. The thickness of the diffusion layer was made to be around 444 µm. The scattering coefficient for multiple scattering with the diffusion film formed thus was studied. The results thereof are shown in FIG. 24. In FIG. 24, the vertical axis represents the scattering coefficient. As shown in FIG. 24, the peak scattering coefficient is around the wavelength of 550 nm, i.e., in the green wavelength band, where it is 0.3. This means that 30% of the light is scattered. Thus, it can be said that a light diffusing layer having wavelength selectability wherein light of the green wavelength band can be selectively scattered can be realized by dispersing spherical gold particles of 20 nm in radius in a medium having a refractive index of 1.49.

Figure 25:
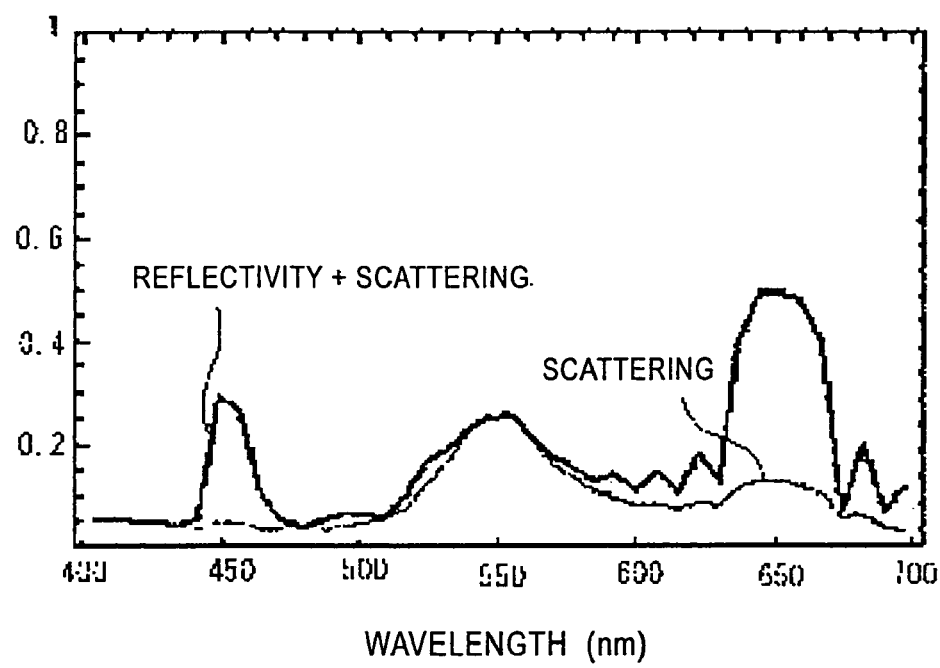
FIG. 25 is a properties diagram illustrating the relation between: scattering, and the total of scattering and reflectivity; and the wavelength, with a projector screen according to a sixth embodiment.

Next, the results of studying disposing this diffusing film on the optical thin film 53 of the projector screen 51 in the first embodiment are as shown in FIG. 25, and it can be understood that the scattering of the light in the red wavelength band is improved over that in other wavelength bands. Accordingly, it can be said that by providing the above-described light diffusing layer on the optical thin film 53 of the projector screen 51 in the first embodiment, scattering properties can be improved in the green wavelength band, but a light diffusing layer using spherical gold particles as the metal fine particles has a great absorption area around 550 nm, so marked improvement in the scattering properties cannot be obtained, and accordingly this is suitable for supplementary fine adjustment. Note that the vertical axis in FIG. 25 represents the scattering and the sum of scattering and reflectivity.

[Seventh Embodiment]

With the seventh embodiment, a light diffusing layer having spectral scattering properties using spherical silver particles as metal fine particles, and a projector screen using the same, were studied. First, the real part n of the complex refractive index of silver, i.e., the refractive index and the imaginary part k, i.e., the value of the extinction coefficient, is as described in the fourth embodiment.

Figure 26:
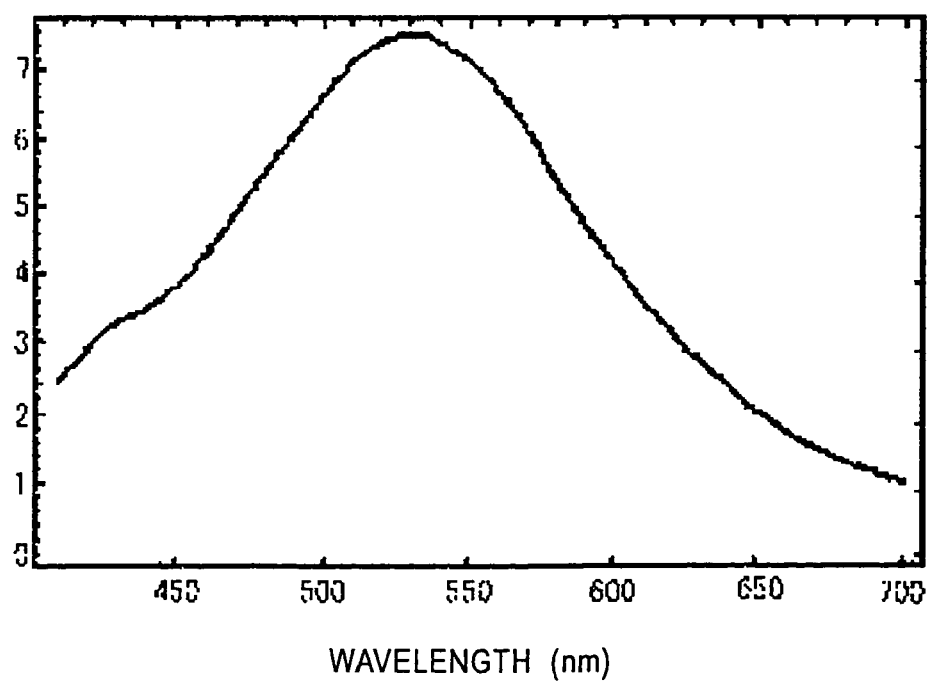
FIG. 26 is a properties diagram illustrating the scattering efficiency of a single spherical silver particle.

With the seventh embodiment, unlike the fourth embodiment, spherical silver particles of 40 nm in radius are dispersed in a medium of which the refractive index is 1.6 to form a light diffusing layer. The scattering efficiency obtained by dividing the scattering cross-sectional area with the projection area is as shown in FIG. 26. The scattering efficiency was calculated by Mie scattering using complex refractive index with regard to one spherical silver particle. In FIG. 26, the vertical axis represents the scattering efficiency, i.e., how many times the projection area that scattering is effected. It can be understood from FIG. 26 that the scattering efficiency is maximum at the wavelength of 527 nm.

Figure 27:
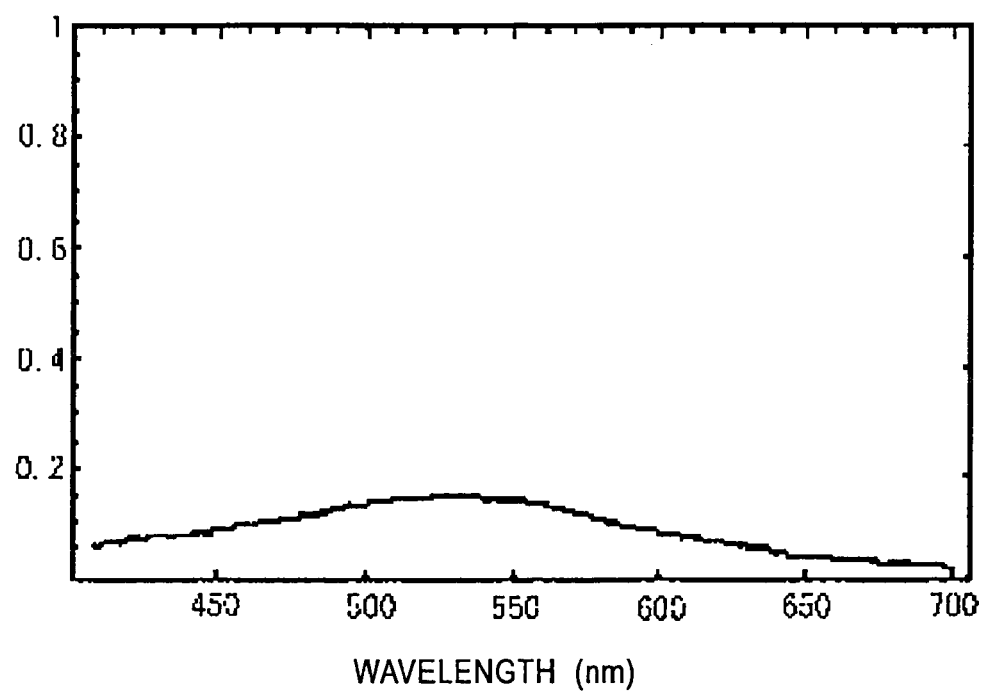
FIG. 27 is a properties diagram illustrating the relation between wavelength and scattering coefficient in the event of multiple scattering of spherical silver particles.

Next, the spherical silver particles were dispersed in a similar medium so that the number density was $3 \times 10^{10}$ particles/cm$^3$, and a diffusion film was formed. The thickness of the diffusion film was made to be around 87 µm. The scattering coefficient for multiple scattering with the diffusion film formed thus was studied. The results thereof are shown in FIG. 27. In FIG. 27, the vertical axis represents the scattering coefficient. As shown in FIG. 27, the scattering coefficient has a gentle peak, and the peak scattering coefficient is around the wavelength of 530 nm, i.e., in the green wavelength band, where it is 0.2. This means that 20% of the light is scattered. Thus, it can be said that a light diffusing layer having wavelength selectability wherein light of the green wavelength band can be selectively scattered can be realized by dispersing spherical silver particles of 40 nm in radius in a medium having a refractive index of 1.6.

Figure 28:
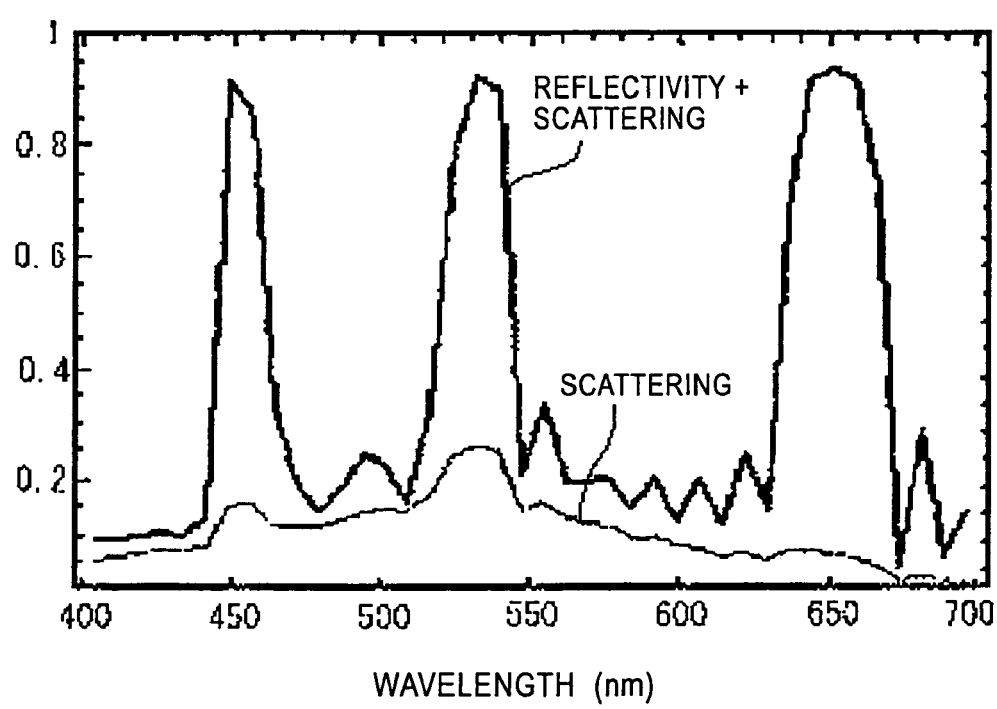
FIG. 28 is a properties diagram illustrating the relation between: scattering, and the total of scattering and reflectivity; and the wavelength, with a projector screen according to a seventh embodiment.

Next, the results of studying disposing this diffusing film on the optical thin film 53 of the projector screen 51 in the first embodiment are as shown in FIG. 28, and it can be understood that the scattering of the light in the red wavelength band is improved over that in other wavelength bands. Accordingly, it can be said that by providing the above-described light diffusing layer on the optical thin film 53 of the projector screen 51 in the first embodiment, scattering properties can be improved in the green wavelength band, but marked improvement in the scattering properties cannot be obtained as with the fourth embodiment, and accordingly this is suitable for supplementary fine adjustment. Note that the vertical axis in FIG. 28 represents the scattering and the sum of scattering and reflectivity.

[Eighth Embodiment]

Figure 29:
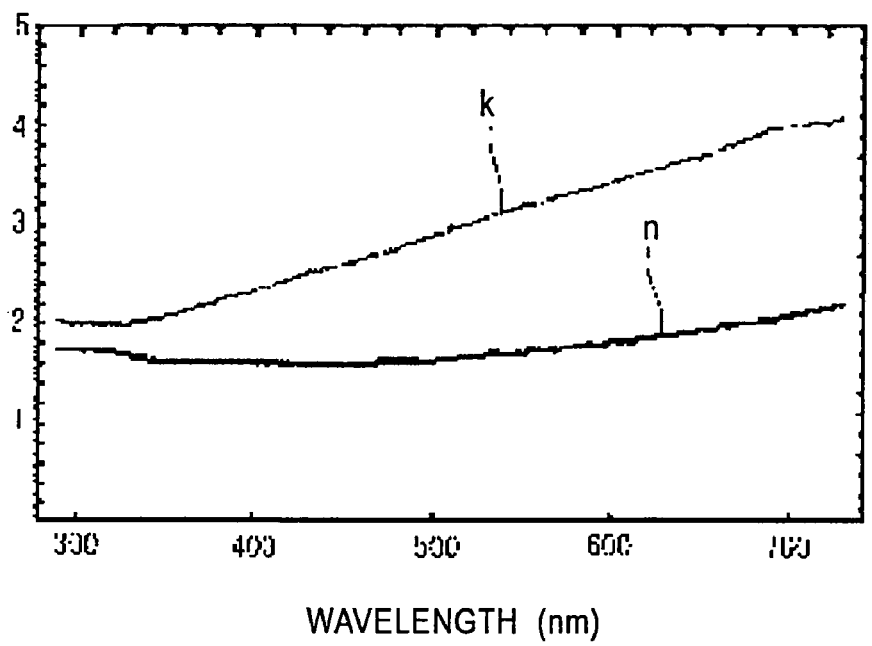
FIG. 29 is a properties diagram illustrating the complex refraction of nickel.

With the eighth embodiment, a case having broader multiple scattering properties than the seventh embodiment was studied. That is, with the eighth embodiment, a light diffusing layer having spectral scattering properties using spherical nickel particles as metal fine particles, and a projector screen using the same, were configured. First, the real part n of the complex refractive index of nickel, i.e., the refractive index and the imaginary part k, i.e., the value of the extinction coefficient, is as shown in FIG. 29. In FIG. 29, the vertical axis represents the value of the real part n and imaginary part k, and the horizontal axis represents the wavelength.

Figure 30:
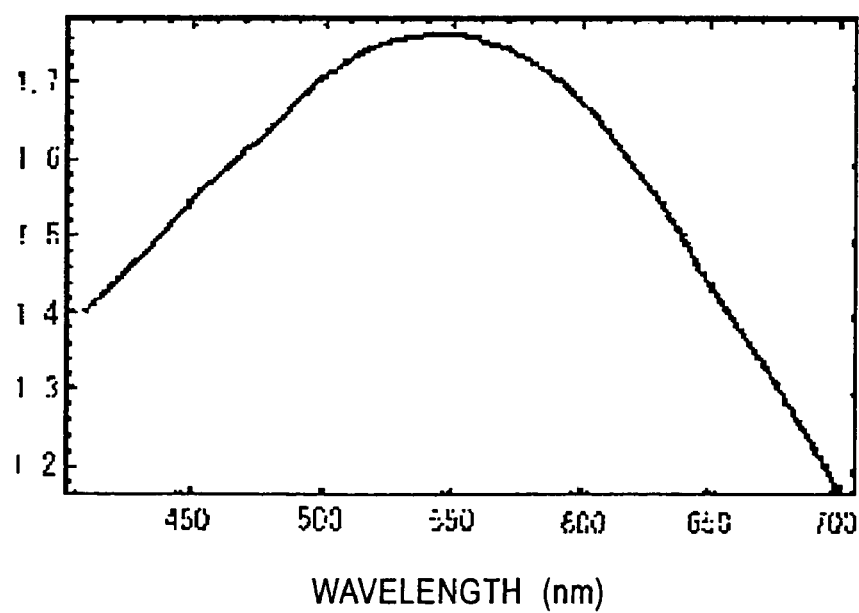
FIG. 30 is a properties diagram illustrating the scattering efficiency of a single spherical nickel particle.

Now, in the event that spherical nickel particles of 49 nm in radius are dispersed in a medium of which the refractive index is 1.6, the scattering efficiency obtained by dividing the scattering cross-sectional area with the projection area is as shown in FIG. 30. The scattering efficiency was calculated by Mie scattering using complex refractive index with regard to one spherical nickel particle. In FIG. 30, the vertical axis represents the scattering efficiency, i.e., how many times the projection area that scattering is effected. As shown in FIG. 30, the scattering efficiency has a gentle peak with a large curve, and is maximum at the wavelength of 542 nm.

Figure 31:
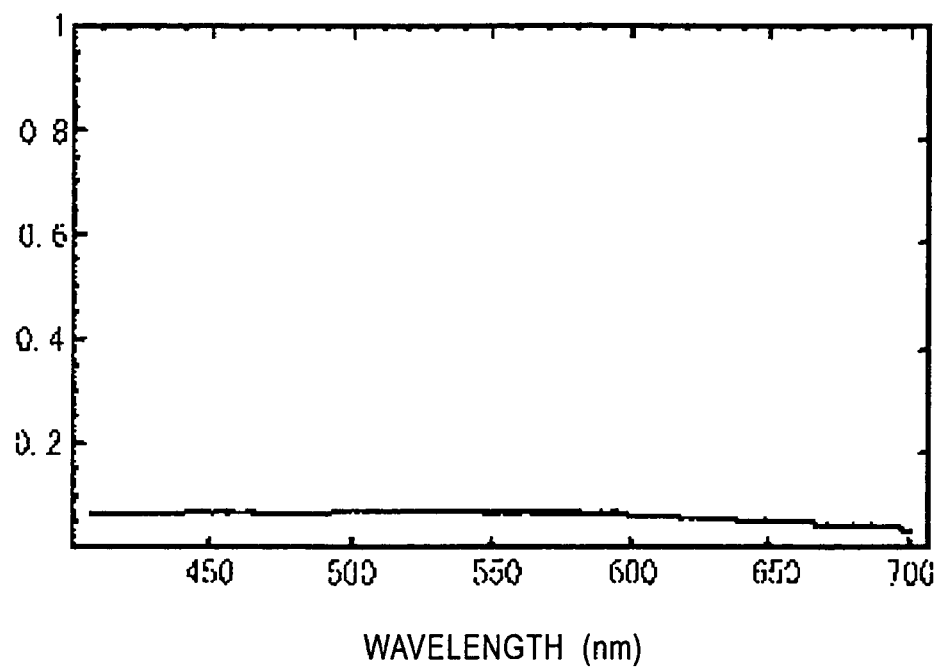
FIG. 31 is a properties diagram illustrating the relation between wavelength and scattering coefficient in the event of multiple scattering of spherical silver particles.

Next, the spherical silver particles were dispersed in a similar medium so that the number density was $8 \times 10^9$ particles/cm$^3$, and a diffusion film was formed. The thickness of the diffusion film was made to be around 468 µm. The scattering coefficient for multiple scattering with the diffusion film formed thus was studied. The results thereof are shown in FIG. 31. In FIG. 31, the vertical axis represents the scattering coefficient. As shown in FIG. 30, the scattering coefficient in the event of multiple scattering is unlike the case of one particle, and exhibits broad properties as shown in FIG. 31, with a peak scattering coefficient of 0.1. This means that 10% of the light is scattered, and also that the scattering properties are improved generally equally over a wider wavelength band from the blue wavelength band to the red wavelength band. Thus, it can be said that a light diffusing layer, wherein the scattering properties are capable of scattering over a wider wavelength band from the blue wavelength band to the red wavelength, can be realized by dispersing spherical nickel particles of 49 nm in radius in a medium having a refractive index of 1.6.

Figure 32:
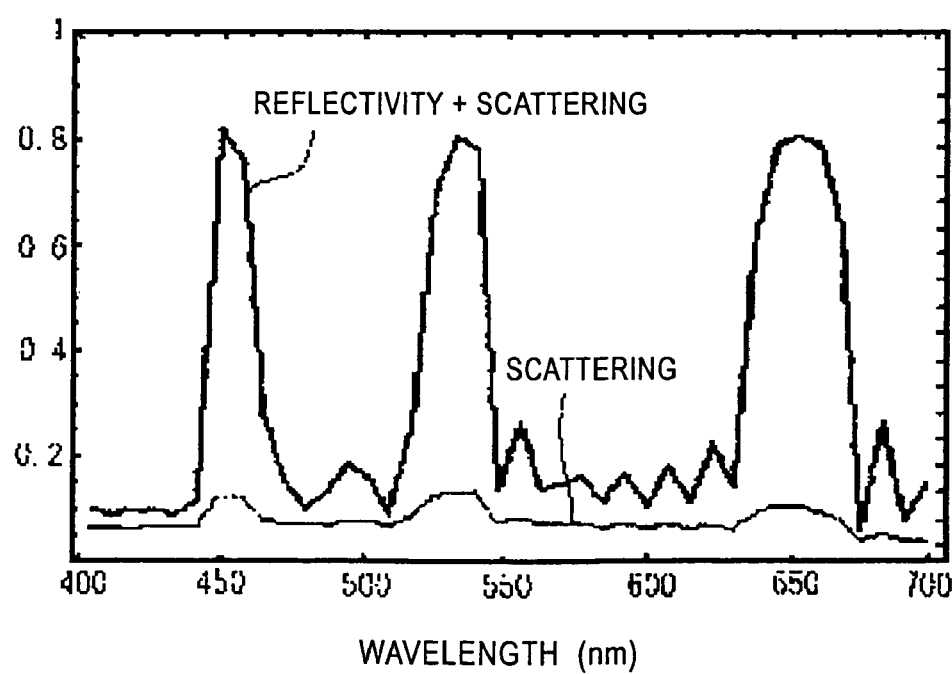
FIG. 32 is a properties diagram illustrating the relation between: scattering, and the total of scattering and reflectivity; and the wavelength, with a projector screen according to an eighth embodiment.

Next, the results of studying disposing this diffusing film on the optical thin film 53 of the projector screen 51 in the first embodiment are as shown in FIG. 32, and it can be understood that the scattering of the light in the blue wavelength band, the green wavelength band, and the red wavelength band, is somewhat improved over that in other wavelength bands. Accordingly, it can be said that by providing the above-described light diffusing layer on the optical thin film 53 of the projector screen 51 in the first embodiment, scattering properties can be improved in the green wavelength band, but marked improvement in the scattering properties cannot be obtained in this case, and accordingly this is suitable for supplementary fine adjustment. Note that the vertical axis in FIG. 32 represents the scattering and the sum of scattering and reflectivity.

Now, while an example of displaying images by primarily projecting narrow-band tricolor wavelength band light has been described in the above embodiments, the projection screen according to the present invention is not restricted to narrow-band tricolor wavelength band light, light-emitting devices such as light-emitting diodes for example, which have a relatively wide light-emitting wavelength as compared with lasers or the like, can also be used for the light source. Also, an arrangement may be made by combining a light source with a somewhat wide bandwidth with filters, non-linear optical devices, or non-linear optical thin films, to divide the wavelength thereof within the visible range like the three primary colors. That is, the present invention may be used with LED projectors having a light source with a broadness in wavelength or narrow to a certain extent, or other types of projectors which use general tricolor wavelength bands. The present invention can also be used effectively with a monochromatic light source.

The projection screen according to the present invention is a projection screen for projecting thereupon narrow-band tricolor wavelength band light to display an image, and comprises an optical thin film which has high reflection properties regarding the narrow-band tricolor wavelength band light, and has high transmission properties regarding at least visible wavelength band light other than the wavelength band light, upon a supporting member.

The projection screen configured as described above has an optical thin film such as described above, so narrow-band tricolor wavelength band light is reflected and light of other wavelength bands is generally transmitted through the optical thin film.

Accordingly, with this projection screen, reflection of external light can be greatly suppressed compared to normal screens. Consequently, deterioration in contrast of the image formed on the projection screen is suppressed while effectively reducing influence of external light, thereby obtaining a bright image. Thus, with this projection screen according to the present invention, a clear image can be obtained even in the event that the projection environment is bright, and a clear image can be obtained unaffected by the brightness of the projection environment.

Also, the present invention may be of a configuration having an optical thin film which has high reflection properties regarding light of a predetermined wavelength band, and has high transmission properties regarding visible wavelength band light other than the wavelength band light, upon a supporting member, such that light having the predetermined wavelength band is reflected at the primary wavelength band thereof in the same way, and light of other wavelength bands is generally transmitted through the optical thin film. Thus, a clear image can be obtained regarding light of a predetermined wavelength band as well, and according to the present invention, a clear image can be provided unaffected by the brightness of the projection environment.

The invention claimed is:

1. A projection screen for projecting thereupon narrow-band tricolor wavelength band light to display an image;
   comprising a film which has high reflection properties regarding said narrow-band tricolor wavelength band light, and has high transmission properties regarding at least visible wavelength band light other than said wavelength band light;
   wherein said film is comprised of a dielectric multi-layer film wherein high-refractive-index layers and low-refractive-index layers are alternately layered, and wherein, with the refractive index of each layer in the dielectric multi-layer film as n and the film thickness of each layer as d, the optical thickness nd of each layer of the dielectric multi-layer film satisfies the following Expression (1) with regard to each wavelength λ of said narrow-band tricolor wavelength band light $nd=\lambda(a\pm\frac{1}{4})$ (where a is a natural number).

2. A projection screen according to claim 1, wherein the optical thickness nd of each layer of the dielectric multi-layer film is in a range between 1.462 μm to 1.467 μm.

3. A projection screen according to claim 1, wherein the dielectric multi-layer film is formed with the incident side of the narrow-band tricolor wavelength band light and the outermost layer on the opposite side thereof being high-refractive-index layers.

4. A projection screen according to claim 1, wherein said high-refractive-index layer is comprised of one or more of cerium oxide, zirconium oxide, zinc sulfide and titanium oxide, and said low-refractive-index layer is comprised of magnesium fluoride.

5. A projection screen according to claim 1, further comprising a light absorption layer for absorbing light transmitted through said optical thin layer.

6. A projection screen according to claim 5, wherein said light absorption layer includes a black paint.

7. A projection screen according to claim 6, wherein said light absorption layer is a backing including a black paint.

8. A projection screen according to claim 1, wherein said narrow-band tricolor wavelength band light is laser light.

9. A projection screen according to claim 1, further comprising a light diffusing layer as the outermost layer of said optical thin film or as an intermediate layer of said optical thin film.

10. A projection screen according to claim 9, wherein said light diffusing layer has high scattering properties regarding said narrow-band tricolor wavelength band light.

11. A projection screen according to claim 9, comprising a plurality of said light diffusing layer.

12. A projection screen according to claim 9, wherein light diffusing layer includes one of silver particles, copper particles, gold particles, or nickel particles.

13. A projection screen according to claim 1, wherein the optical thickness nd of each layer of the dielectric multilayer film is approximate thickness.

14. A projection screen for projecting thereupon light of a predetermined wavelength band to display an image;
comprising a film which has high reflection properties regarding said light of a predetermined wavelength band, and has high transmission properties regarding at least visible wavelength band light other than said wavelength band light; and
wherein said film is comprised of a dielectric multi-layer film wherein high-refractive-index layers and low-refractive-index layers are alternately layered, and wherein, with the refractive index of each layer in the dielectric multi-layer film as n and the film thickness of each layer as d, the optical thickness nd of each layer of the dielectric multi-layer film satisfies the following Expression (2) with regard to the primary wavelength $\lambda p$ of said wavelength band $nd=\lambda p(a\pm 1/4)$ (where a is a natural number).

15. A projection screen according to claim 14, wherein the optical thickness nd of each layer of the dielectric multi-layer film is in a range between 1.462 μm to 1.467 μm.

16. A projection screen according to claim 14, wherein the dielectric multi-layer film is formed with the incident side of light having said wavelength band and the outermost layer on the opposite side thereof being high-refractive-index layers.

17. A projection screen according to claim 14, wherein said high-refractive-index layer is comprised of one or more cerium oxide, zirconium oxide, zinc sulfide, titanium oxide, and said low-refractive-index layer is formed of magnesium fluoride.

18. A projection screen according to claim 14, further comprising a light absorption layer for absorbing light transmitted through said optical thin film.

19. A projection screen according to claim 18, wherein said light absorption layer includes a black paint.

20. A projection screen according to claim 19, wherein said light absorption layer is a backing including a black paint.

21. A projection screen according to claim 14, wherein light having said wavelength band is light emitted by respective light-emitting diodes.

22. A projection screen according to claim 14, further comprising one or a plurality of light diffusing layers as the outermost layer of said optical thin film or as an intermediate layer of said optical thin film.

23. A projection screen according to claim 22, wherein light diffusing layer includes one of silver particles, copper particles, gold particles, or nickel particles.

24. A projection screen according to claim 14, wherein the optical thickness nd of each layer of the dielectric multilayer film is approximate thickness.

* * * * *